United States Patent
Banga et al.

(10) Patent No.: US 11,115,429 B2
(45) Date of Patent: Sep. 7, 2021

(54) DEVICE AND NETWORK CLASSIFICATION BASED ON PROBABILISTIC MODEL

(71) Applicant: Balbix, Inc., San Jose, CA (US)

(72) Inventors: Gaurav Banga, Cupertino, CA (US); Vansh Makh, San Francisco, CA (US); Vinay Sridhara, Santa Clara, CA (US); Rajarshi Gupta, Sunnyvale, CA (US); Aravind Raghava Iyengar, Santa Clara, CA (US); Sumanth Maram, Milpitas, CA (US)

(73) Assignee: Balbix, Inc., San Jose, CA (US)

( * ) Notice: Subject to any disclaimer, the term of this patent is extended or adjusted under 35 U.S.C. 154(b) by 1064 days.

(21) Appl. No.: 15/473,418

(22) Filed: Mar. 29, 2017

(65) Prior Publication Data

US 2018/0048534 A1    Feb. 15, 2018

Related U.S. Application Data

(63) Continuation-in-part of application No. 15/234,970, filed on Aug. 11, 2016, now Pat. No. 10,320,829, and (Continued)

(51) Int. Cl.
*H04L 29/06* (2006.01)
*H04L 12/24* (2006.01)
(Continued)

(52) U.S. Cl.
CPC ......... *H04L 63/1433* (2013.01); *G06N 20/00* (2019.01); *H04L 41/046* (2013.01); (Continued)

(58) Field of Classification Search
CPC .................................................. H04L 63/1433
(Continued)

(56) References Cited

U.S. PATENT DOCUMENTS

| 7,181,769 B1* | 2/2007 | Keanini | H04L 63/1416 |
| | | | 713/166 |
| 7,519,954 B1* | 4/2009 | Beddoe | H04L 63/1433 |
| | | | 709/224 |

(Continued)

OTHER PUBLICATIONS

M. A. Bode, S. A. Oluwadare, B. K. Alese and A. F. Thompson, "Risk analysis in cyber situation awareness using Bayesian approach," 2015 International Conference on Cyber Situational Awareness, Data Analytics and Assessment (CyberSA), London, 2015, pp. 1-12, doi: 10.1109/CyberSA.2015.7166119. (Year: 2015).*

*Primary Examiner* — James D. Rutten
(74) *Attorney, Agent, or Firm* — Brokaw Patent Law PC; Christopher J. Brokaw

(57) ABSTRACT

Programmatic mechanisms that enable the automatic assignment of categories to network entities based on observed evidence. Agents gather observation data that identifies observations made by agents about the network and a plurality of nodes of the network. The agents provide the observation data to a classification module, which assigns a device category to the nodes of the network based on the observation data and a probabilistic node model. The probabilistic node model considers several probabilities to ascertain a recommended device category for a particular node, such as probabilities based on a manufacturer of a node, an operating system executing on a node, information about other nodes in the local vicinity of a node, and an administrator web page associated with a node. The classification module may also assign a particular network category to the network based on the observation data and a probabilistic network model.

23 Claims, 16 Drawing Sheets

Related U.S. Application Data a continuation-in-part of application No. 15/234,980, filed on Aug. 11, 2016, now Pat. No. 10,313,384.

(51) Int. Cl.
  *G06N 20/00*   (2019.01)
  *G06N 7/00*   (2006.01)
  *G06N 5/04*   (2006.01)

(52) U.S. Cl.
  CPC .............. *H04L 41/14* (2013.01); *G06N 5/043* (2013.01); *G06N 7/005* (2013.01); *H04L 41/142* (2013.01)

(58) Field of Classification Search
  USPC .......................................................... 706/52
  See application file for complete search history.

(56) References Cited

U.S. PATENT DOCUMENTS

| | | | |
|---|---|---|---|
| 7,813,354 B1* | 10/2010 | Norris | H04W 8/005 |
| | | | 370/338 |
| 8,805,982 B1* | 8/2014 | Wilsey | H04L 41/12 |
| | | | 709/223 |
| 9,621,431 B1* | 4/2017 | Cardente | H04L 41/147 |
| 2012/0203724 A1* | 8/2012 | Chun | G06N 20/00 |
| | | | 706/46 |
| 2017/0250879 A1* | 8/2017 | Chadha | G06F 16/24569 |
| 2017/0279829 A1* | 9/2017 | Vasseur | G06N 20/00 |
| 2017/0366562 A1* | 12/2017 | Zhang | H04L 63/1433 |
| 2018/0270229 A1* | 9/2018 | Zhang | H04W 12/06 |

* cited by examiner

| Windows Enterprise Network | | |
|---|---|---|
| | Multiple Subnets | Enterprise Grade Networking Gear |
| | DNS name for AD, SOA record points to AD, etc. | |
| | ID: AD-Name | |

| Non-windows Enterprise Network | | |
|---|---|---|
| | Single Subnet or Multiple Subnets | Enterprise Grade Networking Gear |
| | No AD | |
| | ID: DHCP_DOMAIN+NW_CHARACTERISTICS | |

| Home Network | | |
|---|---|---|
| | Single Subnet | Consumer Grade Networking Gear |
| | ID: DHCP_DOMAIN+MAC_ADDRESS_DEF_ROUTER+DHCP_SERVER_IP | |

| Guest Network | | |
|---|---|---|
| | Single Subnet | Consumer or Enterprise Grade Networking Gear |
| | ID: DHCP_DOMAIN+MAC_ADDRESS_DEF_ROUTER | |

FIG. 13

| OSPF, RIP *might* be seen | WPA2 Enterprise, WPA2 Professional | No Captive Portal | Wired or WiFi | Sometimes Connect to this via VPN |
|---|---|---|---|---|
| OSPF, RIP *might* be seen | WPA2 Enterprise, WPA2 Professional | No Captive Portal | Wired or WiFi | Sometimes Connect to this via VPN |
| OSPF, RIP not Seen | WPA2 Professional or WEP | No Captive Portal | Wired or WiFi | Never Connect to this via VPN |
| OSPF, RIP not Seen | WPA2 Professional or WEP | Sometimes will see Captive Portal, specially with WEP | Almost Always WiFi - SSID String often contains "guest" or | Never Connect to this via VPN |

FIG. 13 (CONT.)

| | | |
|---|---|---|
| Sometimes 802.1x for Wired or WiFi | Multiple or Single Egress IPs, Static or Dynamic | |
| Sometimes 802.1x for Wired or WiFi | Multiple or Single Egress IPs, Static or Dynamic | Network_CHARACTERISTICS = SSID_NAME+ROUTING_PROTOS+ COMMON_INTERNAL_DNS_SPACE+ CONNECTIVITY_TO_KEY_Ips |
| No 802.1x | Single Egress IP but often Dynamic | |
| No 802.1x | Single Egress IP but often Dynamic | |

FIG. 13 (CONT.)

DEVICE AND NETWORK CLASSIFICATION BASED ON PROBABILISTIC MODEL

CLAIM OF PRIORITY AND RELATED APPLICATIONS

The present application is a continuation-in-part of, and claims priority to, U.S. patent application Ser. No. 15/234,970, filed on Aug. 11, 2016, entitled "Comprehensive Modeling and Mitigation of Security Risk Vulnerabilities in an Enterprise Network," the disclosure of which is hereby incorporated by reference for all purposes as if fully set forth herein.

The present application also is a continuation-in-part of, and claims priority to, U.S. patent application Ser. No. 15/234,980, filed on Aug. 11, 2016, entitled "Mitigation of Security Risk Vulnerabilities in an Enterprise Network," the disclosure of which is hereby incorporated by reference for all purposes as if fully set forth herein.

The present application is related to U.S. patent application Ser. No. 15/383,656, filed on Dec. 19, 2016, entitled "Risk Modeling," the disclosure of which is hereby incorporated by reference for all purposes as if fully set forth herein.

FIELD OF THE INVENTION

Embodiments of the invention generally relate to classifying networks and network-enabled devices.

BACKGROUND

Enterprises and other operators of computer networks often desire to know with specificity what devices are connected to their network. However, obtaining such information manually is a very time consuming process which is prone to error. Several approaches for programmatically generating a list of devices connected to a network exist in the prior art. For example, certain firewalls may be able to provide a list of network-enabled devices which seek to communicate through the firewall. However, such approaches of this nature would naturally fail to identify any devices which are not sending packets through the firewall. As illustrated by this example, such prior art approaches often provide incomplete results.

In addition to knowing what devices are connected to a network, network operators often desire to know information about the types of devices that are connected to their network. Certain software approaches in the prior art may be used to supply information of this nature. For example, System Center Configuration Manager (SCCM), available from Microsoft Corporation of Redmond, Wash., is a systems management software product for managing large groups of computers. Using SCCM, an administrator may manually create one or more device categories. Users may then choose a device category for their device when they register their device with SCCM. Based on this association made by each user, an administrator may view information about what device categories users self-identified as being associated with their devices given a set of choices of device categories manually determined by a network administrator. Unfortunately, this approach also exhibits many drawbacks, such as being time consuming due to the manual input required by many parties, being susceptible to a high degree of user error, and permitting a high degree of incomplete and inaccurate information, to name but a few.

Given the increasing prevalence of mobility in network-enabled devices, the need to accurately identify what computer networks are presently accessible to a network-enabled device is critical. Thus, it is also desirable to know what networks are accessible to network-enabled devices, as it is natural for network-enabled devices, such as laptops, tablet computers, and cell phones, to travel with their user. Most prior art approaches employ very simplistic approaches for determining what networks are available, as little or no attention is made to authenticate the identity presented by each network. For example, certain operating systems might store information about the name of a user's home network or enterprise network; thereafter, if another network is encountered having the same name, then that operating system might conclude that the present network is the same as the network previously encountered with the same name. However, in this day and age, this assumption need not always be true.

Consequently, approaches for improving the information available about networks and the network-enabled devices are extremely valuable to those charged with protecting the health and security of network entities in our increasing computerized society. The observations discussed in this background section are observations which may not be widely held, known, or ascertainable by parties other than the inventor. Therefore, one cannot assume that anything discussed in this background section is prior art to the present application simply by its inclusion in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 13 is a chart depicting certain traits associated with various exemplary network categories according to an embodiment of the invention.

DETAILED DESCRIPTION OF THE INVENTION

Figure 1:
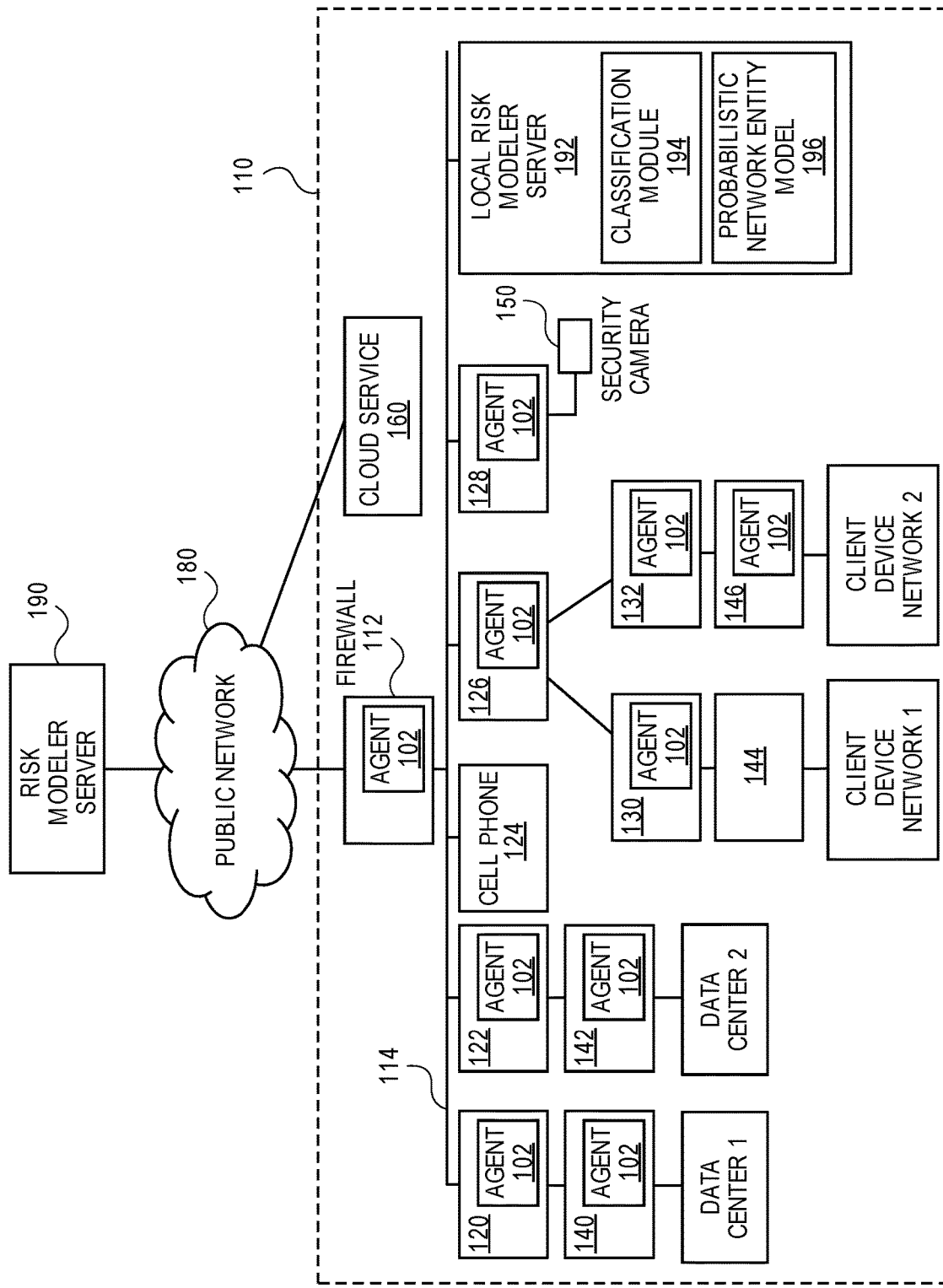
FIG. 1 is a block diagram of a system according to an embodiment of the invention.

Approaches for programmatic mechanisms that enable the automatic assignment of categories to network entities based on observed evidence are presented herein. The categories assigned to network entities, such as a network or a network-enabled node, may be used in managing the risk exposure assumed by digital assets and in the evaluation of how that assumed risk exposure can be mitigated through specific courses of action. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Virtually all modern enterprises employ an internal network to which a large number of network-enabled devices are connected. In addition to the networked computers and digital assets of the enterprise, each employee often uses multiple computerized devices in the course of their duties and daily life, such as a personal computer, laptop computer, cell phone, and the like. Each device coupled to the enterprise network is a potential attack vector against the enterprise.

The term "Internet of Things" (abbreviated IOT) has been widely adopted to refer to the trend of connecting a wide variety of electronic devices to a computer network. Enterprises shoulder an ever-increasing risk from attack from such unlikely sources, such as a networked flat screen television used in a conference room or a web-enabled security camera which can connect to the Internet and the enterprise's intranet.

It is observed that customized malware and computerized attacks against the digital resources of an enterprise are designed to target the perceived weakest link in the exposed perimeter of the enterprise network. By way of analogy, attacks against the digital assets of an enterprise will attempt to breach the wall protecting those assets by building a ladder to clamber over the lowest point in the wall, and so, continuing with this analogy, resources and attention are better spent shoring up the lowest point in the wall rather than other locations in the wall which are reasonably impregnable in view of the assets being protected behind the wall.

Embodiments of the invention may be used to programmatically identify, via a systematic and methodical process, all devices, or nodes, which are connected to a computer network. Programmatic mechanisms of embodiments further enable the automatic assignment of categories to network entities, such as network-enabled nodes and individual computer networks, based on observed evidence. Agents gather observation data that identifies observations made by the agents about networks accessible to each enterprise node and nodes of the enterprise network. The agents provide the observation data to a classification module, which assigns a device category to the nodes of the network based on the observation data and a probabilistic node model. This probabilistic node model considers several probabilities to ascertain a recommended device category for a particular node, such as probabilities based on manufacturer information (such as an Organization Unique Identifier (OUI) of a node), an operating system executing on a node, information about other nodes in the local vicinity of a node, and an administrator web page associated with a node. The classification module may also assign a particular network category to a particular network based on the observation data and a probabilistic network model.

The categories assigned to network entities by embodiments of the invention may be used for a variety of security purposes. For example, such categories may be valuable to a network administrator responsible for ensure that all devices connected to the computer network are used appropriately, i.e., in a manner of which the enterprise or owner approves given the intended use associated with an assigned device category. As another example, categories assigned to network entities by an embodiment may be considered in ascertaining the risk to the enterprise presented by that network entity. Approaches for presenting information, in a variety of different ways, that describes the risk to the privacy and integrity of the enterprise network based on the computerized enterprises' assets will be discussed. For example, embodiments may depict a risk heat map which graphically depicts the risk to the enterprise's assets posed by of all the enterprise's network-connected devices. The risk heat map may be overlaid with the enterprises' organizational chart, network diagram, and other illustrations which may intuitively impart information to the viewer.

The features discussed above are intended to provide a high level overview of certain capabilities of several embodiments, but not a complete enumeration of all the features of all embodiments discussed herein.

System Overview

FIG. 1 is a block diagram of a system according to an embodiment of the invention. FIG. 1 depicts an enterprise network 110, a public network 180, and risk modeler servers 190 and 192 of an embodiment. Enterprise network 110, as broadly used herein, represents any computer network belong to or used by any entity, such as but not limited to a company, an enterprise, an organization, a government, or any other entity. Enterprise network 110 represents any type of computer network and is not limited to, or dependent upon in any respect, any particular type of operator of the network.

For clarity, enterprise network 110 is depicted in FIG. 1 as comprising a handful of devices; however, in practice, enterprise network 110 may comprise many hundreds of thousands of devices or more. Moreover, the arrangement of devices in enterprise network 110 shown in FIG. 1 is merely a simplified example, as embodiments of the invention do not require any particular logical arrangement of devices in enterprise network 110. Thus, it should be understood that enterprise network 110 may constitute any arrangement of devices configured in any conceivable manner.

A wide variety of different devices may be connected to enterprise network 110, including electronic devices not classically thought of as a computer. For this reason, as broadly used herein, any electronic device capable of communicating with enterprise network 110 shall be referred to herein as a node. Thus, non-limiting examples of nodes of enterprise network 110 include those typically associated with the term computer, such as a personal computer (PC), a laptop computer, a server, a router, a printer, a desk phone, a tablet device, a personal digital assistance (PDA), a firewall server 112, a mainframe, and the like. Other non-limiting examples of nodes of enterprise network 110 include those not typically associated with the term computer, such as a cell phone 124, a television, a digital security camera 150, wearable technology, security systems, web-enabled appliances, a digital video recorder (DVR), a game console, and the like.

As used herein, the term 'perimeter' refers to those nodes of enterprise network 110 which directly communicate with public network 180. For example, a node of enterprise network 110 which allows the user to use a web browser or access their web-based personal email account shall be said to reside on the perimeter of enterprise network 110, regardless of where that node physically exists or disposed within the logical or physical structure of enterprise network 110.

If a node is not on the perimeter of enterprise network 110, then the node is said to reside in the core of enterprise network 110. Thus, if a node is in the core of enterprise network 110, that node does not directly communicate with public network 180; however, a node in the core of enterprise network 110 can communicate with other nodes of enterprise network 110 over Intranet 114. It is strategically advantageous for important assets to reside in the core, rather than the perimeter, given that the core is insulated from security breaches to a certain extent by the perimeter.

Figure 2:
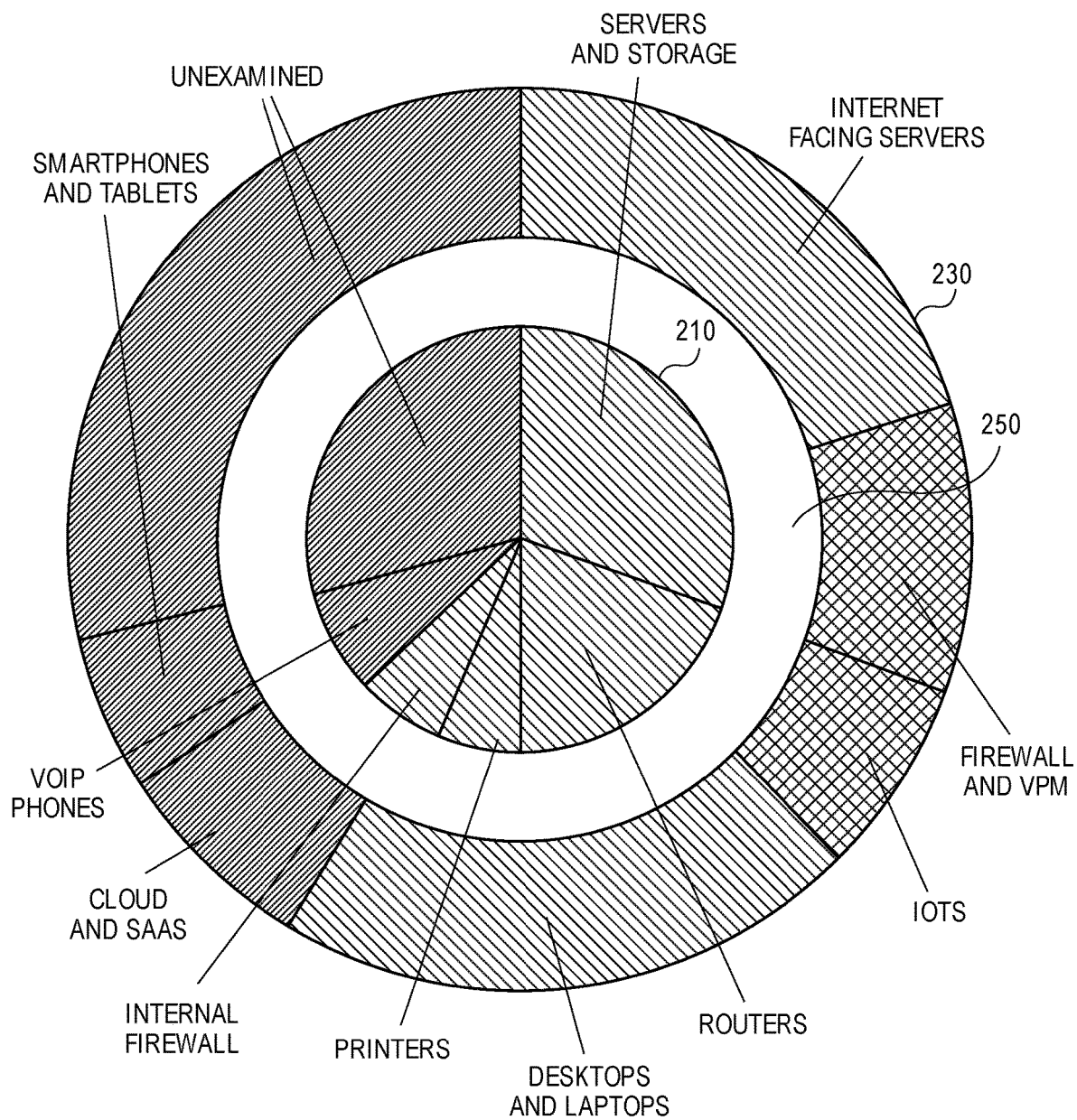
FIG. 2, which is a diagram illustrating the core and perimeter of an enterprise network according to an embodiment of the invention.

To illustrate characteristics of the core and perimeter, consider FIG. 2, which is a diagram illustrating the core 210 and perimeter 230 of an exemplary enterprise network according to an embodiment of the invention. Core 210 may comprise resources secured against direct access to public network, e.g., nodes of a data center, Point of Sale (PoS) nodes, private cloud(s), and other assets are often not directly exposed to public networks such as the Internet. In the exemplary embodiment of FIG. 2, core 210 comprises servers and storage, routers, printers, Internet firewalls, Voice Over IP (VOIP) telephones, and certain miscellany/unexamined assets.

Perimeter 230 may comprise resources directly accessible over, or connected to, public network 180, e.g., a perimeter may comprise public cloud services, firewall and virtual private network devices, Internet facing servers, misconfigured or incorrectly used core systems, and virtual desktop interface (VDI) client endpoints. In the exemplary embodiment of FIG. 2, perimeter 230 comprises Internet facing servers, firewall and Virtual Product Managers (VPMs), Internet of Things (IOT) nodes, desktops and laptops, Cloud and Software as a Service (SAAS) nodes and services, and certain miscellany/unexamined assets. Those skilled in the art shall appreciate that FIG. 2 depicts one example of an arrangement of nodes split between a perimeter and a core and that any number of arrangements may be used in practice.

Note that enterprises may not always know with precision which nodes of enterprise network 110 reside in perimeter 230 and which reside in core 210. Thus, a misconfigured or incorrectly used core system could expose certain assets to perimeter 230, thereby rendering those assets more vulnerable to a security breach. A zone of propagation (ZoP) 250 exists between perimeter 230 and core 210. In certain prior approaches, zone of propagation 250 offered no resistance or barriers to intruders once perimeter 230 was breached. Thus, once one node in core 210 is breached by a malicious attacker, then that attacker can use that compromised node to launch other attacks against targets in core 210, thereby further jeopardizing the assets of core 210. Various approaches for allowing zone of propagation 250 to act as a resistant barrier to thwart security breaches by malicious parties and/or insiders according to embodiments of the invention shall be discussed below.

Certain nodes on the perimeter of enterprise network 110 may include related assets and services capable of affecting the privacy and integrity of enterprise network 110 while nevertheless being out of the direct control of the operator of enterprise network 110. For example, cloud-services, such as cloud-service 160, used by the enterprise also reside on the perimeter of enterprise network 110. As another example, the personal mobile devices (such as a personal, non-work related cell phone 124) used by employees or authorized users of enterprise network 110, which may contain work related information (such as but not limited to passwords and digital credentials) as well as personal information, are also on the perimeter of enterprise network 110.

FIG. 1 depicts an example arrangement of nodes of enterprise network 110. As depicted in FIG. 1, nodes 120, 122, 124, 126, 128, 130, 132, 140, 142, 144, 146, 150, and 160 are arranged in a logical structure and communicate over Intranet 114. Data center 1 and 2 as well as client device network 1 and 2 depicted in FIG. 1 may each comprise any number of nodes in any arrangement.

Public network 180 is intended to represent any type of publically accessible network, such as but not limited to the Internet.

Risk modeler server 190, as broadly used herein, refers to one or more servers accessible by enterprise network 110 over public network 180. Thus, while FIG. 1 depicts risk modeler server 190 as a single entity, in practice risk modeler server 190 may be implemented on two or more servers for scalability and fault-tolerant purposes. The role played by risk modeler server 190 in various embodiments shall be explained below; however, in brief, risk modeler server 190 may install one or more agents onto nodes of enterprise network 110. These agents will disperse over the nodes of enterprise network 110 and will provide, to risk modeler server 190, information (termed "observation data") used by risk modeler server 190 to build an enterprise risk model, such as enterprise risk model 500 depicted in FIG. 5. Risk modeler server 190 may thereafter receive information from one or more sources, such as for example the agents installed on enterprise network, learned professionals, and information about current events, to refine and perfect enterprise risk model 500 over time.

Local risk modeler server 192, as broadly used herein, refers to one or more servers accessible by enterprise network 110 over Intranet 114. Thus, while FIG. 1 depicts local risk modeler server 192 as a single entity, in practice local risk modeler server 192 may be implemented on two or more servers for scalability and fault-tolerant purposes.

Local risk modeler server 192 may perform certain responsibilities instead of, or in tandem with, risk modeler server 190. Certain embodiments may only include one of risk modeler server 190 and local risk modeler server 192; thus, if either risk modeler server 190 and local risk modeler server 192 is present the other may, but need not, also be present. In an embodiment, local risk modeler server 192 may comprise probabilistic node model 700, which shall be discussed in greater detail below; alternately, probabilistic node model 700 may be alternately or additionally deployed upon risk modeler server 190.

Embodiments may employ local risk modeler server 192 without employing risk modeler server 190 in situations where privacy is of paramount concern, as no data will be transmitted over public network 180. Risk modeler server 190 may be used with a single enterprise network or a plurality of enterprise networks; thus, in certain embodiments, risk modeler server 190 may have the benefit of refining the enterprise risk model using a plethora of information collected from a plurality of enterprise networks.

In an embodiment, local risk modeler server 192 may be hosted in public network 180 as a shared server connected securely to enterprise network 110. This secure connection might be via a point-to-point VPN tunnel or other secure connections such as but not limited to a Transport Layer Security (TLS) connection.

In the embodiment depicted in FIG. 1, local risk modeler server 192 comprises a classification module 194 and a probabilistic network entity model 196. As broadly used herein, classification module 194 refers to a set of software processes, executing on a physical machine, which are responsible for categorizing a network entity, such as a network or a network-enabled node, in consultation with probabilistic network entity model 196. Classification module 194 and probabilistic network entity model 196 are described in greater detail below.

Modeling Different Attack Vectors

In an embodiment, the one or more agents 102 executing on certain nodes of enterprise network 110 may collect certain data ("observation data") about nodes of enterprise network. The observation data collected by the one or more agents may then be transmitted to risk modeler server 190 or local risk modeler server 192 for subsequent analysis. The observation data may identify, for a particular node, be it a habitable node or an opaque node, certain relative vulnerabilities of that node.

Figure 3:
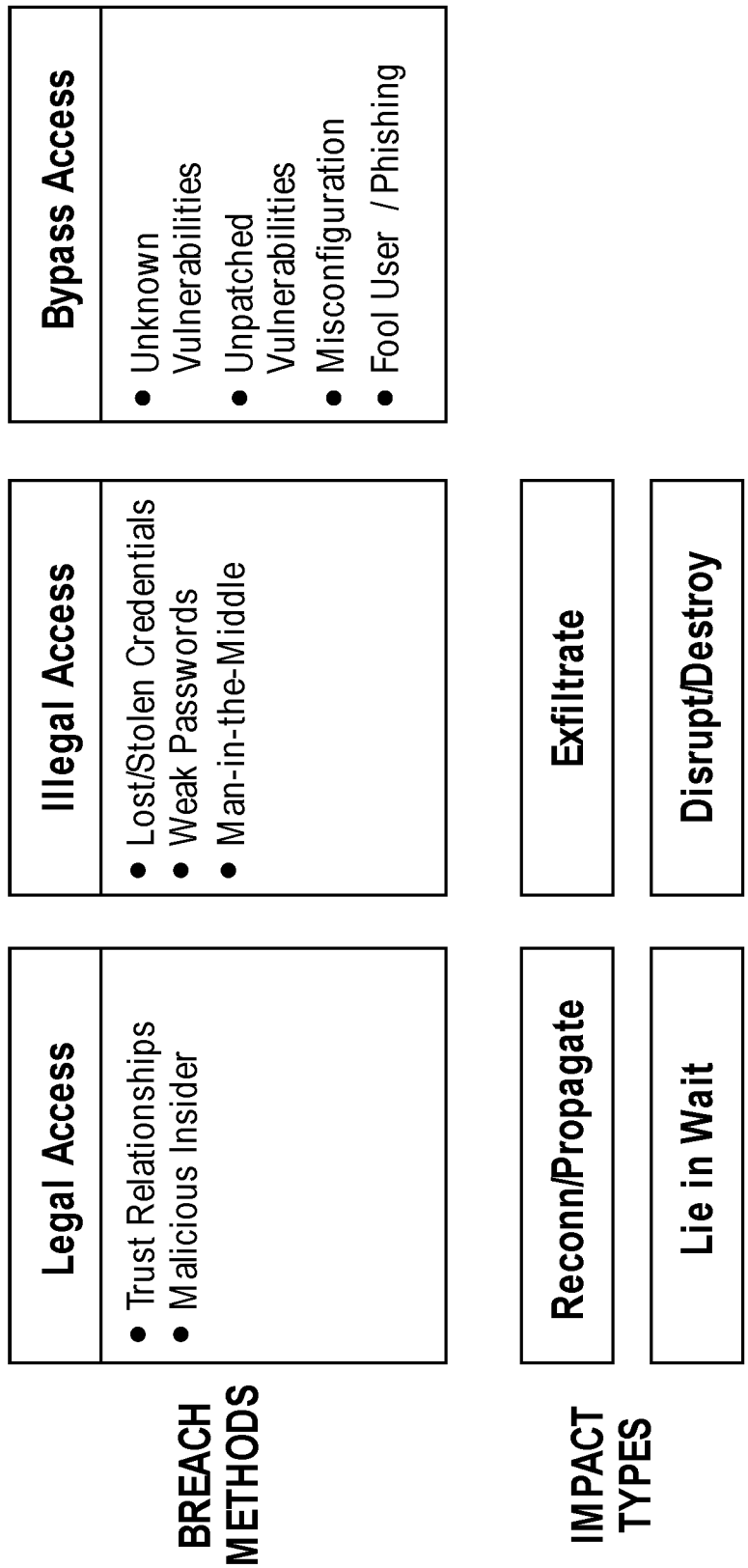
FIG. 3 is an illustration of risk categories presented to nodes of a network which may be evaluated using categories assigned by embodiments of the invention.

FIG. 3 is an illustration of risk categories presented to nodes of a network which may be evaluated using categories assigned by embodiments of the invention. In an embodiment, the observation data, sent from a particular agent 102 to either risk modeler server 190 or local risk modeler server 192, may comprise data describing a node's vulnerabilities or exposure to certain breach methods or attack vectors, such legal access, illegal access, and bypass access. The legal access breach method corresponds to a security breach perpetrated by a trusted user or trusted entity. Non-limiting examples of a legal access breach methods include activity by a malicious user who has legitimate access to the node (in other words, a "malicious insider") or activity initiated at another node which is trusted (but may be compromised by malicious software). Legal access attacks may impact an organization vis-à-vis recon/propagation as well as lie in wait attacks.

The illegal access breach method corresponds to a security breach perpetrated vis-à-vis the malicious acquisition of credentials. For example, the observation data collected by an agent 102 may comprise password information that describes how passwords are used on a particular node. This password information may identify any weak passwords employed by the particular node, any shared passwords used by the particular node and another entity other than said particular node, and whether the particular node does not require a password to access certain assets or services. In this way, the enterprise risk model may assess the vulnerabilities of credentials used by nodes of enterprise network 110 for purposes of quantifying the risk posed thereby and providing a relative measure of how that risk differs from node to node and from an acceptable baseline level.

The bypass access breach method corresponds to a security breach perpetrated by a software vulnerability used to bypass the access control system. For example, a bypass access breach method may be a software bug or glitch that allows the attacker to bypass the access control system. Non-limiting, illustrative examples of a bypass access breach method include zero day attacks, unpatched software vulnerabilities, and man-in-the-middle attacks. Certain software installed on a node may be more vulnerable to zero day attacks or may require more frequent software patches.

Generating the Multi-Layer Model

Figure 4:
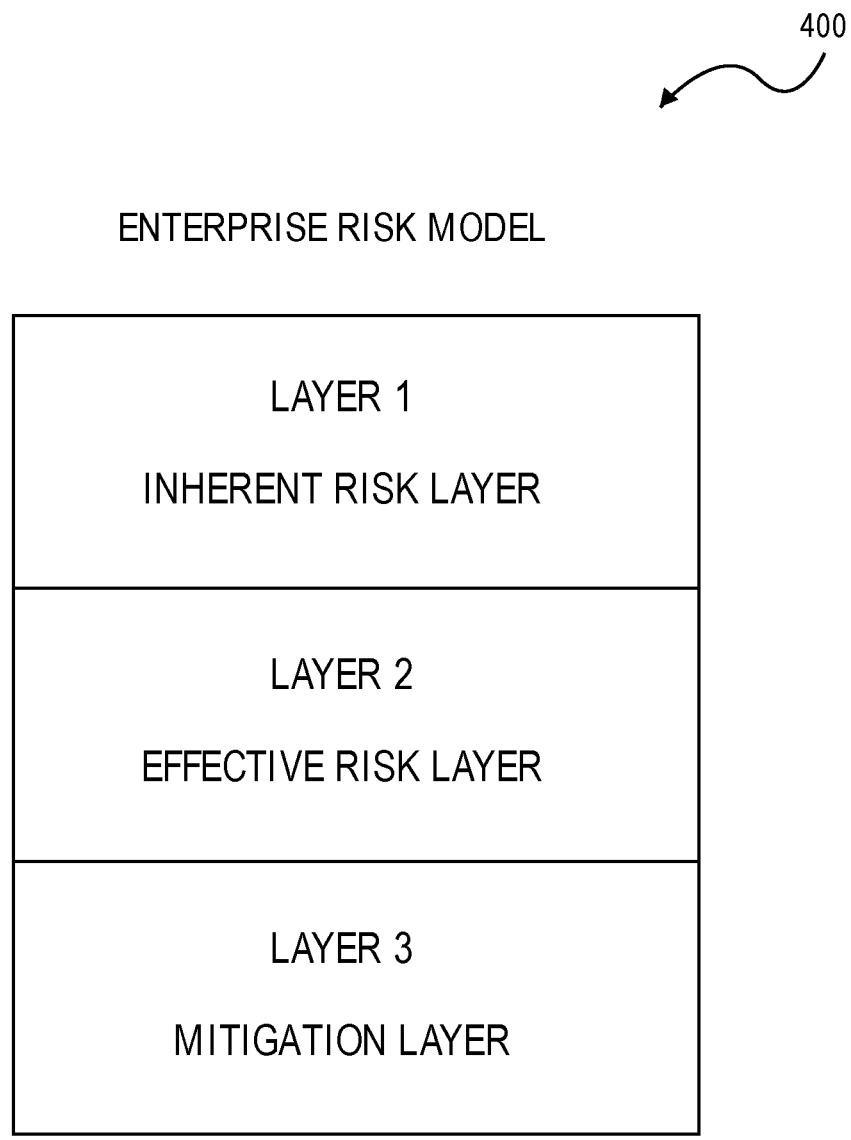
FIG. 4 is an illustration of an enterprise risk model according to an embodiment of the invention.

The enterprise risk model of an embodiment may comprise a variety of different layers so that a variety of different nuances and complexities may be modeled and considered. FIG. 4 is an illustration of an enterprise risk model 400 according to one embodiment of the invention. As shown in FIG. 4, enterprise risk model 400 may comprise a layer (termed an "inherent risk layer" or layer 1) that models an inherent risk presented to the enterprise network based on static features of the enterprise network. The inherent risk layer may also model the risk presented to the enterprise from both authorized and unauthorized users of the network.

An enterprise risk model of an embodiment may also comprise a layer (termed a "effective risk layer" or layer 2) that models a present state of risk to the enterprise network caused by dynamic conditions, such as global, temporal events, and specific attack methods and tactics which may be in active use by attackers at any given moment of time. The enterprise risk model of an embodiment may also comprise a layer (termed a "mitigation layer" or layer 3) that models a reduction in risk to the enterprise network in response to the performance of potential mitigative actions, implemented mitigative actions, and mitigative actions in the process of being implemented.

Enterprise risk model 400 is generated by scientifically observing all nodes and assets of enterprise network 110. Using enterprise risk model 400, embodiments are able to predict, analytically and scientifically, the nodes of enterprise network 110 which are likely presently compromised and the likelihood of each node of enterprise network 110 becoming compromised in the future. In addition to identifying the relative likelihood of each node of enterprise network 110 becoming compromised in the future, enterprise risk model 500 may be used by embodiments to predict the likelihood of how those nodes will likely be breached or compromised by malicious code in the future.

Figure 5:
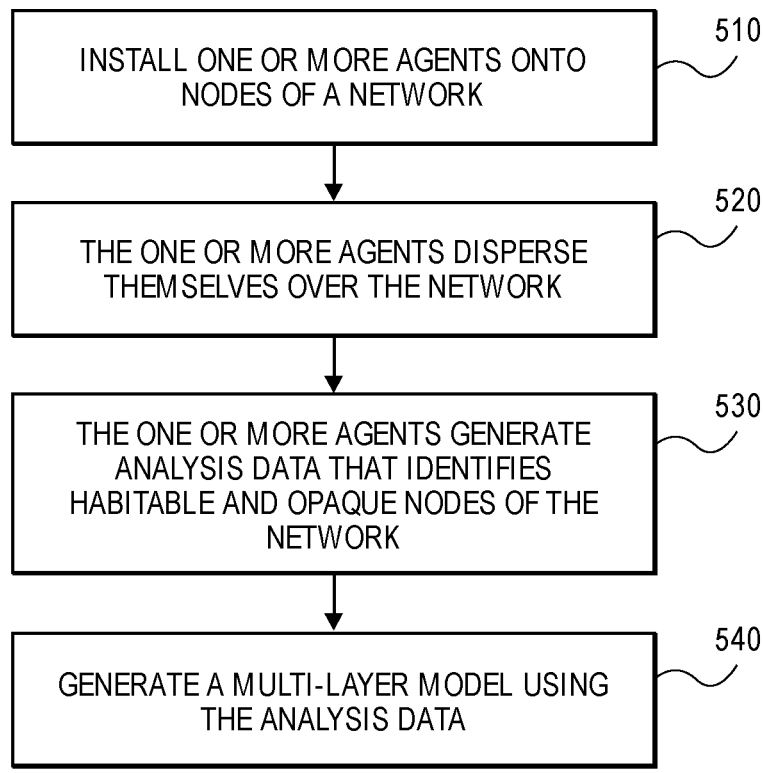
FIG. 5 is a flowchart illustrating the steps of analyzing the security of a network according to an embodiment of the invention.

FIG. 5 is a flowchart illustrating the steps of analyzing the security of a network according to an embodiment of the invention. Note that the sequence of steps illustrated in FIG. 5 may be performed in a difference sequence than that depicted. For example, certain steps of FIG. 5 may be performed in parallel with one another or certain steps may be repeatedly performed. Thus, the logical progression of steps depicted in FIG. 5 is merely for explanation purposes and practical embodiments may employ any of the steps of FIG. 5 when appropriate.

In step 510, one or more agents 102 are installed onto nodes of enterprise network 110. Either risk modeler server 190 or local risk modeler server 192 may be the source of the dissemination of agents 102 onto one or more nodes of enterprise network 110 in step 510. Alternatively, agents 102 may be installed and managed by any other software provisioning server. As step 510 is performed with the blessing of the operator of enterprise network 110, the operator of enterprise network 110 may permit risk modeler server 190 to access enterprise network 110 by providing sufficient access credentials to the risk modeler server 190. Alternately, the operator of risk modeler server 190 may provide software to the operator of enterprise network 110 so that the operator of enterprise network 110 may themselves install one or more agents 102 onto nodes of enterprise network 110. For example, local risk model server 192 may be established on Intranet 114 to facilitate the dissemination of one or more agents 102 over Intranet 114 in step 510.

One or more agents 102, as broadly used herein, are software agents that are configured to, among other tasks, monitor nodes of enterprise network 110 for purposes of collecting information used in constructing and refining enterprise risk model 400. The functions performed by one or more agents 102 according to certain embodiments of the invention shall be described in more detail below.

There are two types of nodes, namely habitable nodes and opaque nodes. A habitable node is a node of enterprise network 110 that possesses a computing environment conducive to installation of an agent 102. On the other hand, an opaque node is a node of enterprise network 110 that possesses a computing environment not conducive to installation of an agent 102. For example, a personal computer is an example of a habitable node, because an agent 102 may be installed upon a personal computer without difficulty. An example of an opaque node is an iPhone, as software cannot be installed on an iPhone without the consent and co-operation of Apple Corporation. Another potential example of an opaque node is a web-enabled security camera which, while being capable of sending and receiving data over enterprise network 110, lacks a sophisticated enough computing environment to facilitate the installation of agent 102.

Certain opaque nodes may expose an application program interface (API) to enable requestors to retrieve information from the node. For example, a network router often supports a Simple Network Management Protocol (SNMP) interface that enables a requestor to query information from the device. An agent 102 of an embodiment may use this SNMP interface to collect information from the network router, even if the agent 102 is not installed on that network router. As another example, an Active Directory Server will often comprise a Lightweight Directory Access Protocol (LDAP) interface that enables a requestor to query information from the Active Directory Server. An agent 102 of an embodiment may use this LDAP interface to collect information from the Active Directory Server, even if the agent 102 is not installed on the Active Directory Server.

Note that certain embodiments may employ a plurality of different types of agents 102. In such an embodiment, there may exist a particular type of agent 102 designed to execute on a particular computing environment which supports only a minimal set of software, such as a web-enabled security camera. In such an embodiment then, the web-enabled security camera may be considered a habitable node for an agent that supports installation thereon.

An agent 102 may be installed in network proximity (e.g., same subnet and/or same VLAN) as an opaque node. Even though an agent 102 cannot be installed upon an opaque node, an agent 102 may observe and measure network activity going to and from an opaque node; in this manner, agent 102 can generate observation data on opaque nodes. If available, an agent may also obtain using an API exposed by an opaque node to collect information about the opaque node. After one or more agents 102 have been installed on at least one habitable node of enterprise network 110, step 520 may be performed.

In step 520, one or more agents 102 disperse themselves over enterprise network 110. Each agent 102, upon being installed upon a particular habitable node of enterprise network 110, analyzes enterprise network 110 to determine what other adjacent nodes are visible to that agent 102. After identifying what adjacent nodes are visible, either agent 102, server 190, or server 192 may install another instance of agent 102 on any visible node which is a habitable node. In an embodiment, one or more agents discover and probe other nodes across Intranet 114 or any other wired or wireless network in enterprise network 110. After one or more agents are executing upon a habitable node, step 630 may be performed.

In step 530, one or more agents 102 generate observation data that identifies the discovered habitable and opaque nodes of enterprise network 110. Each of one or more agents 102 provides the observation data it generates to either risk modeler server 190 or local risk modeler server 192. The received observation data is used by risk modeler server 190 and/or local risk modeler server 192 in the generation and refinement of enterprise risk model 400.

Either on their own initiative, or in response to receiving a request for additional information about the features or characteristics of nodes of enterprise network 110 from risk modeler server 190 or local risk modeler server 192, during their execution while deployed, each of one or more agents 102 may provide observation data that describes certain information about nodes of enterprise network 110. In an embodiment, such observation data may describe network observations, device observations, user observations, asset observations, and cloud-storage observations.

Non-limiting, illustrative examples of network observations include information about open ports (such as but not limited to a TCP or UDP port that has been opened by a device to allow other devices to connect to itself or send packet to itself, and deployed network protocols). Network observations described by observation data in an embodiment may include the identification of any explicit port or implicit port on a habitable node or an opaque node. An explicit port is a port, opened on a node, to enable connections with other nodes over the network. An implicit port is opened by a device to allow the bi-directional flow of packets with another connected device (e.g. while browsing an external website like www.cnn.com).

Non-limiting, illustrative examples of device observations include information about files stored on the node, software (such as operation system, applications including web browsers, and BIOS) versions and installed patches, security protocols under use. Non-limiting, illustrative examples of user observations include information about user privileges and authentication protocols.

Even though an agent 102 cannot be installed upon an opaque node, an agent 102 may observe and measure network activity going to and from an opaque node; in this manner, agent 102 can generate observation data on opaque nodes. If available, an agent may also obtain using an API exposed by an opaque node to collect information about the opaque node. After one or more nodes 102 provide exposure data and observation data to risk modeler server 190, step 640 may be performed.

In step 540, risk modeler server 190 generates enterprise risk model 400 using, at least in part, the analysis obtained in step 530. The inherent risk layer (layer 1 of enterprise risk model 400 depicted in FIG. 4) models an inherent risk presented to the enterprise network based on static features of nodes of enterprise network 110. The inherent risk layer may be generated using the exposure data received in step 530.

Figure 6:
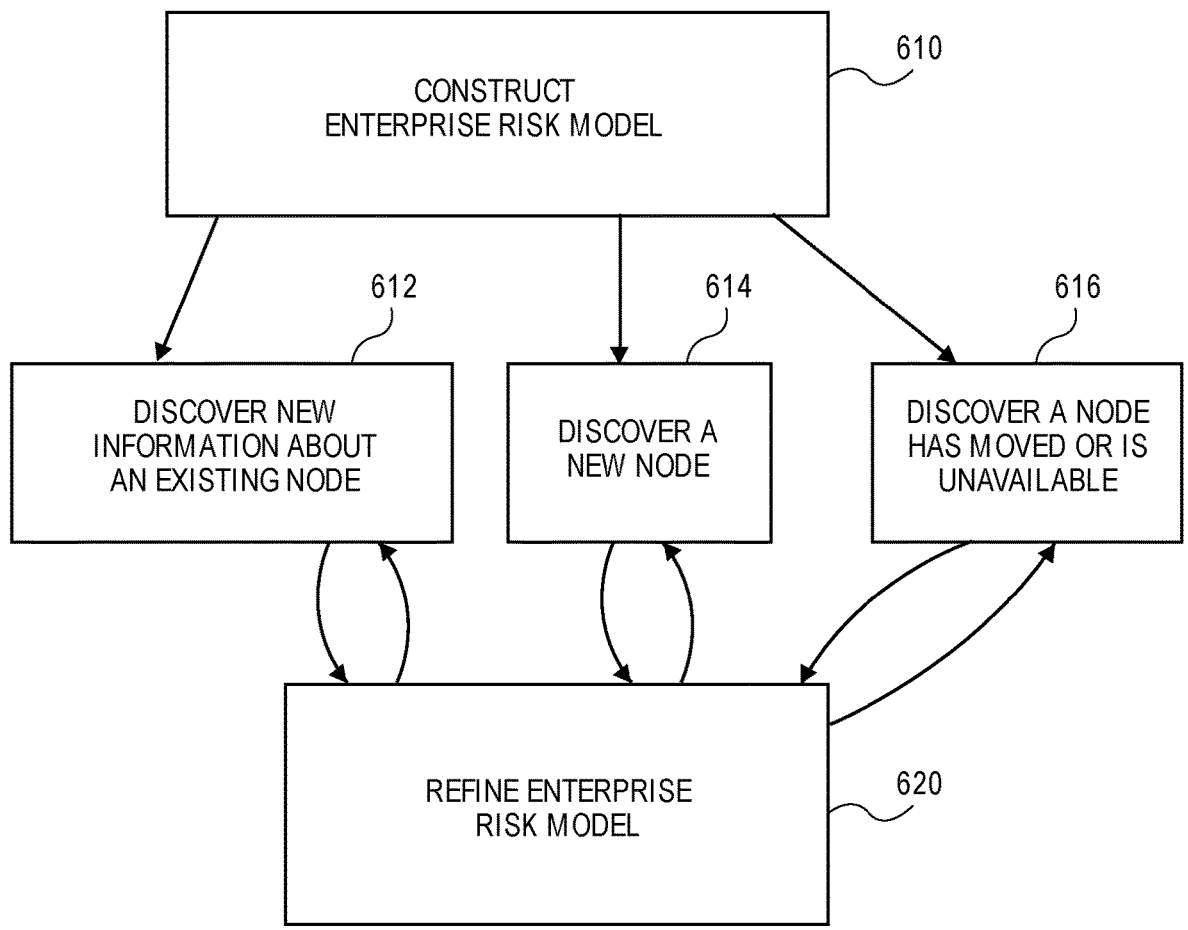
FIG. 6 is a flowchart illustrating the steps of refining the enterprise risk model over time according to an embodiment of the invention.

Observation data will be received periodically during the deployment of one or more agents 102. Thus, enterprise risk model 400 may be improved and refined over time as information is learned about the nodes of enterprise network 110. To illustrate this principle, consider FIG. 6, which is a flowchart illustrating the steps of refining enterprise risk model 400 over time according to an embodiment of the invention.

In step 610, enterprise risk model 400 is constructed. Enterprise risk model 400 may be embodied vis-à-vis a variety of different forms. After enterprise risk model 400 is constructed, steps 612, 614, 616 may be performed in any order at any time. Thus, there is no implied sequence or order of steps 612, 614, 616.

In step 612, an agent 102 discovers new information about an existing node. For example, such information may include, without limitation, what software (including version numbers, patch installations, and authorized or unauthorized modifications and/or customizations) is installed on the node, what hardware or devices are comprises within or connected to the node, information about the configuration of software installed on the node, information about what processes are executing on the node, information about how a user is using the node, and information about the files, file structure, and digital resources stored on or accessible by the node. In response, agent 102 will generate exposure data that describes the new information about the existing node and transmit the exposure data to the entity responsible for refining enterprise risk model 400, e.g., risk modeler server 190 or local risk modeler server 192.

In step 614, an agent 102 discovers a new node on enterprise network 110. The newly discovered node may be a habitable node or an opaque node. In response, agent 102 will generate exposure data that describes the new information about the new node and transmit the exposure data to the entity responsible for refining enterprise risk model 400, e.g., risk modeler server 190 or local risk modeler server 192. If the newly discovered node is a habitable node, then agent 102 may attempt to deploy another instance of itself or otherwise install a copy of agent 102 on the newly discovered node.

In step 616, an agent 102 discovers a node has been moved or is unavailable. For example, a laptop may be physical disconnected an Ethernet port in an office, thereby leaving Intranet 114, and moved to a conference room where the laptop subsequently reconnects to Intranet 114 using a Wi-Fi connection. An agent 102 installed upon the laptop or located on Intranet 114 may detect that the laptop has moved from being physically connected using a specific Ethernet port to a Wi-Fi connection; this transition may or may not pose a change in the risk of a security breach to enterprise network 110 or the laptop itself.

In step 620, enterprise risk model 400 is refined using the information learned in step 612, 614, or 616. Enterprise risk model 400 may be updated frequently as agents 102 re-probe nodes of enterprise network 110 to glean new information. After enterprise risk model 400 is refined or updated, in an embodiment, if necessary, the one or more agents 102 executing in enterprise network 110 may be updated to reflect the latest version of enterprise risk model 400.

Using the Enterprise Risk Model

Enterprise risk model 400 may be used by embodiments in a variety of different ways to yield many positive benefits. For example, enterprise risk model 400 may be used to programmatically generate an enumeration of all assets within enterprise network 110. The list of assets which may be identified in this fashion include all the habitable nodes and all the opaque nodes of enterprise network 110. Thus, embodiments may be used to ascertain and display in a variety of different formats information identifying all the nodes in enterprise network 110 with scientific precision.

In addition to generating a list of physical hardware, the list of assets may be configured to include information about software installed on nodes of enterprise network 110. Thus, enterprise risk model 400 may be used to identify with scientific precision all software, including information identifying the version number, installed patches, and customizations, and configuration settings, installed on nodes of enterprise network 110, as this information may be methodically collected using one or more agents 102.

Probabilistic Node Model

Figure 7:
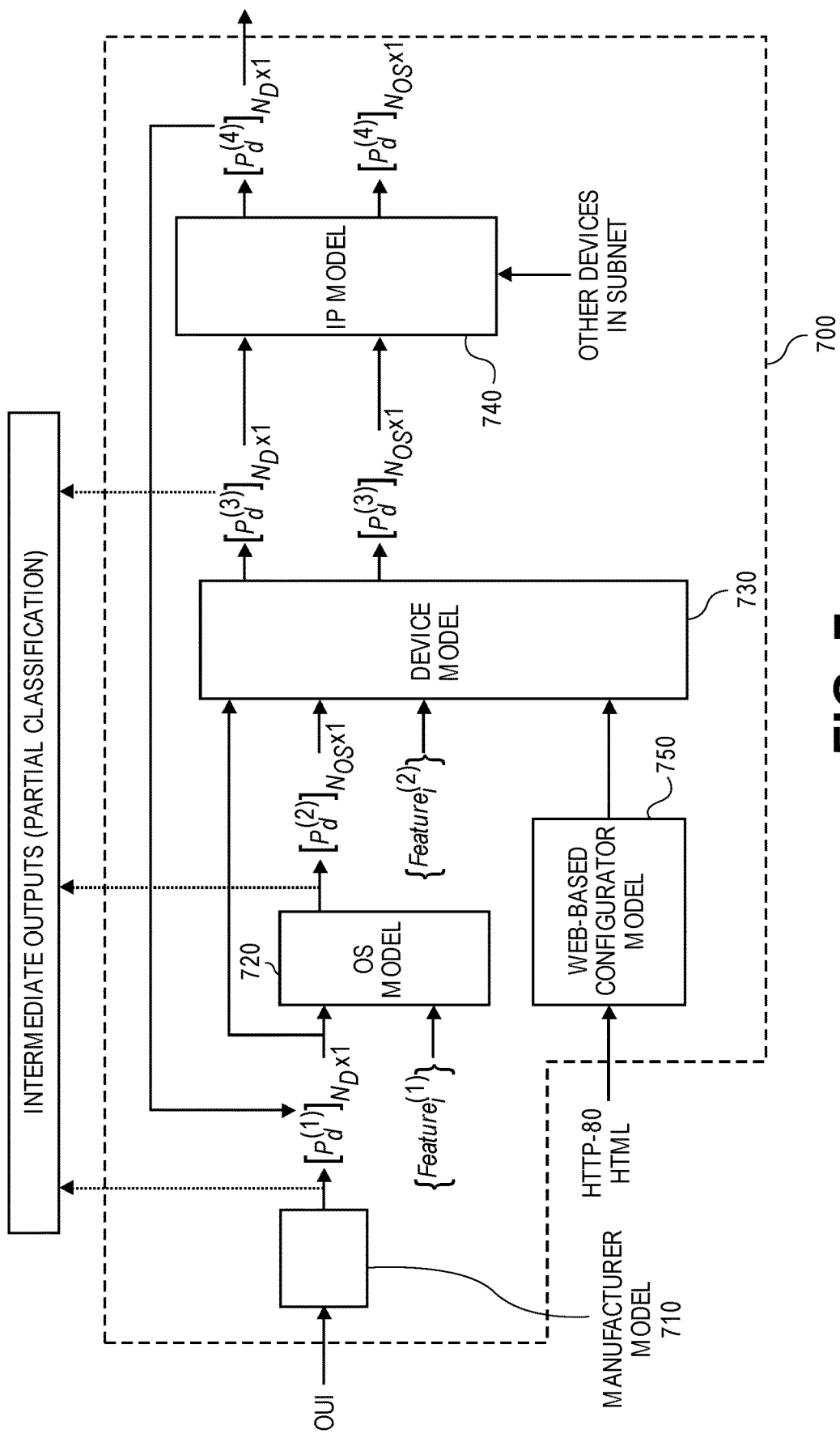
FIG. 7 is a block diagram of a model which may be used to programmatically assign categories to network entities, such as a network-enabled node or a network, according to an embodiment of the invention.

In an embodiment, probabilistic network entity model 196 may include a probabilistic node model. FIG. 7 is a block diagram of a probabilistic node model 700 which may be used to programmatically assign categories to network-enabled nodes of enterprise network 110 according to an embodiment of the invention. In the example shown in FIG. 7, probabilistic node model 700 comprises multiple stages. These multiple stages are handled by various models that are organized under the banner of probabilistic node model 700, namely manufacturer model 710, operating system (OS) model 720, device model 730, Internet Protocol (IP) model 740, and web-based configurator model 750. Those in the art shall appreciate that the functions described as being performed by two or more of these separate models may be performed by a single model or component in other embodiments. Consequently, FIG. 7 is an exemplary example of how one embodiment of the invention may be implemented, as other embodiments may implement probabilistic node model 700 using a different arrangement of one or more models or components.

Probabilistic node model 700 functions to render course categorization to fine categorization for a node based on probability and observed evidence in the form of observation data gathered by one or more agents 102. Thus, probabilistic node model 700 allows for partial classifications to be made and subsequently refined over time.

Manufacturer model 710 is a model which provides, for a given manufacturer of a node, a set of probabilities describing the likelihood that the node associated with the given manufacturer has a particular characteristic and/or is a particular type of device at a relatively high level of granularity. For example, manufacturer model 710 may provide, for a particular manufacturer associated with a node, a set of probabilities that identify the likelihood that the node is particular type of device in a set of device types, such as for example, a storage device, a router, an IOT device, and so on.

The manufacturer of a node may be identified by a variety of different methods, such as by an Organization Unique Identifier (OUI) for a node. Each node of enterprise network 110 has a MAC address. The observation data collected from the nodes of enterprise network 110 by one or more agents 102 and provided by one or more agents 102 to local risk modeler server 192 identifies a MAC address for each node of enterprise network 110. The OUI corresponds to the first 24 bits of the MAC address. The OUI should ideally identify the particular OEM (Original Equipment Manufacturer) for a node, but in some cases the OUI instead identifies the ODM (Original Design Manufacturer) for a physical component comprised within the node. Thus, it is not always a straightforward calculation to identify a device type based on an OUI. Machine learning techniques may be used to assist in this endeavor.

Note that the last 24 bits of the MAC address of a node corresponds to a unique serial number assigned to the device by the manufacturer. However, such a serial number in the last 24 bits of the MAC address may be assigned randomly by the manufacturer. Thus, a first serial number in the MAC address may be assigned to a laptop computer, while the very next sequential serial number may be assigned to a physical display device. As a result, the last 24 bits of the MAC address cannot be reliably used to identify the device type of a node based on its MAC address.

OS model 720 is a model which provides a set of probabilities describing the likelihood that a particular node is executing a particular operating system. For example, OS model 720 may generate a set of probabilities that describe the likelihood that a particular node of enterprise network 110 is running a Windows based operating system, or Linux, or an embedded operating system for example. OS model 720 considers as input in making this determination the set of probabilities generated by manufacturer model 710 as well as additional observations about features of the node learned from the observation data provided by the one or more agents 102.

Device model 730 is a model which provides a set of probabilities describing the likelihood that a particular node is a certain type of device. Device model 730 attempts to refine the information ascertained thus far and to gain further insights about the type of device a particular node is. Device model 730 seeks to achieve a deeper understanding of the nature of the node so that it may be categorized in a manner as specific as possible without sacrificing the accuracy of such classification. Device model 730 considers as input in making this determination the set of probabilities generated by OS model 720 and manufacturer model 710 as well as additional observations about features of the node learned from the observation data provided by the one or more agents 102.

Similar types of devices may be arranged in the same subset or IP space in a well formed or organized computer network. With that in mind, IP model 740 is a model which attempts to gain further insights by extrapolating information about a particular node by looking at the device types of nearby nodes on enterprise network 110. IP model 740 considers as input in making this determination the set of probabilities generated by device model 730 and observations made for the node under consideration as well as that node's neighbors on enterprise network 110.

Embedded devices and IOTs often have an open admin port, which is typically port 80. By accessing this port, an administrator web page, used to configure the device, may be obtained. Such a web page would provide valuable information about the node. Web-based configurator model 750 determines, for each node, whether such an administrator web page is obtainable via an open port. If such a web page is obtainable, then the web page is analyzed to determine what information about the node can be gathered, e.g., often the manufacturer, device type, or specific product or model number is displayed on the web page. Any information about a node learned by web-based configurator model 750 is provided to device model 730 to help inform its decision making process.

Components of probabilistic node model 700 will be discussed in greater detail.

Manufacturer Probabilistic Model

Figure 8:
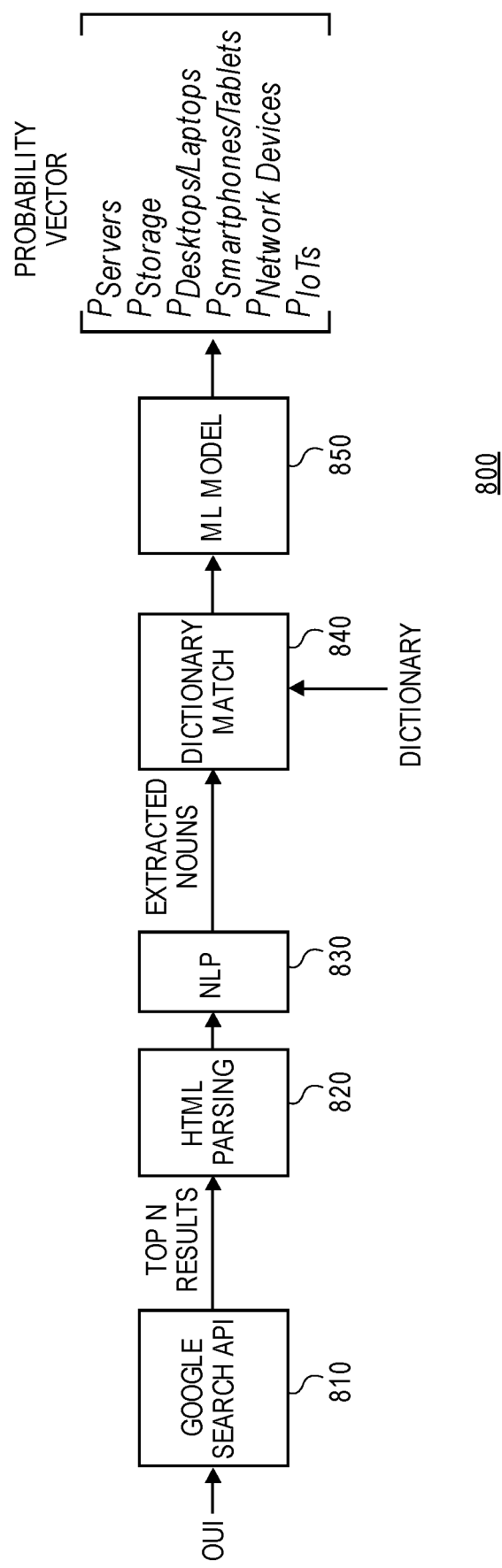
FIG. 8 is a flowchart illustrating the steps performed by the manufacturer model according to an embodiment of the invention.

FIG. 8 is a flowchart illustrating the steps performed by manufacturer model 710 according to an embodiment of the invention. The input to manufacturer model 710 is information identifying a characteristic or datum associated with a particular manufacturer, such as an OUI, name, or other information that may be a factor in identifying a manufacturer of a node. Web-based search engines 810, such as Google and Yahoo, are used to gather a set of web pages related to the manufacturer or OUI for a node. The gathered set of web pages is used to ascertain the types of devices which the manufacturer. Note that the manufacturer in some cases may be an OEM (original equipment manufacturer) while in other cases may be the ODM (original design manufacturer). Alternately, this type of information may be gathered by referencing public information, such as a catalog of the manufacturer.

A set of results deemed most pertinent are sent to HTML parser 820, which extracts the displayed text. Thereafter, natural language processor 830 examines the displayed text to identify potential product names and/or descriptions of the features of the node. To do so, natural language processor 830 extracts a set of nouns deemed potentially relevant to the product names and/or descriptions of the features of the node.

The nouns extracted by natural language processor 830 are input to dictionary match component 840, which matches the extracted nouns against a dictionary for purposes of filtering out noise to identify those key words which are of most interest. Machine learning model 850 may use a variety of techniques, such as a histogram and the like, to learn how much weight to place on a keyword in deciding the probability that the node is a particular type of device. Machine learning model 850 may be trained initially from information gathered by manufacturer catalogs prior to web-based search engines 810 gathered search results from web pages.

OS Probabilistic Model

Figure 9:
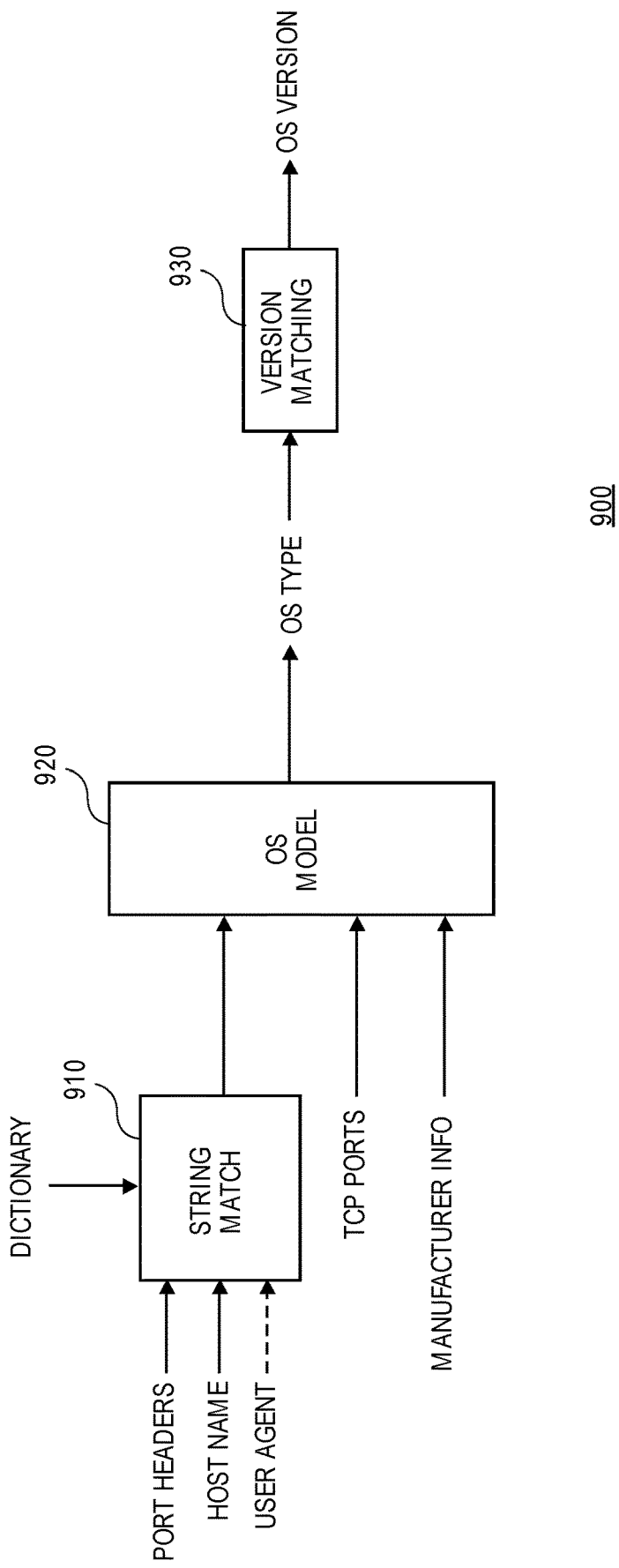
FIG. 9 is a flowchart illustrating the steps performed by the OS model according to an embodiment of the invention.

FIG. 9 is a block diagram illustrating the components of OS model 720 according to an embodiment of the invention. OS model 720 generates as output a set of probabilities describing the likelihood that a particular node has a particular operating system. To do so, OS model 920 of FIG. 9 will take as input probability information generated by manufacturer model 710, information available about TCP ports of the node, as well as additional information available provided by string matching component 910.

String matching component 910 may consider information about open ports of a node, e.g., information describing or characterizing the node may be found in the header of the open port. Further, string matching component 910 may consider information about the host name of a node, e.g., certain products or manufacturers are known to include certain data by default in the host name of a device, which is a strong indication of the identity of the node if present. Alternately, if the host name has been overridden by the user, then the user may have used identifying information, such as "Dan's Apple Laptop," in the host name.

OS model 920 generates a set of probabilities describing the likelihood that the node is executing each of a plurality of different operating systems. Thereafter, this information is fed to version matching component 930 so that it may generate a set of probabilities describing the likelihood that the node is executing each of a plurality of different operating system versions for each operating system for which there is a non-zero probability that the operating system is present on the node.

Device Probabilistic Model

Figure 10:
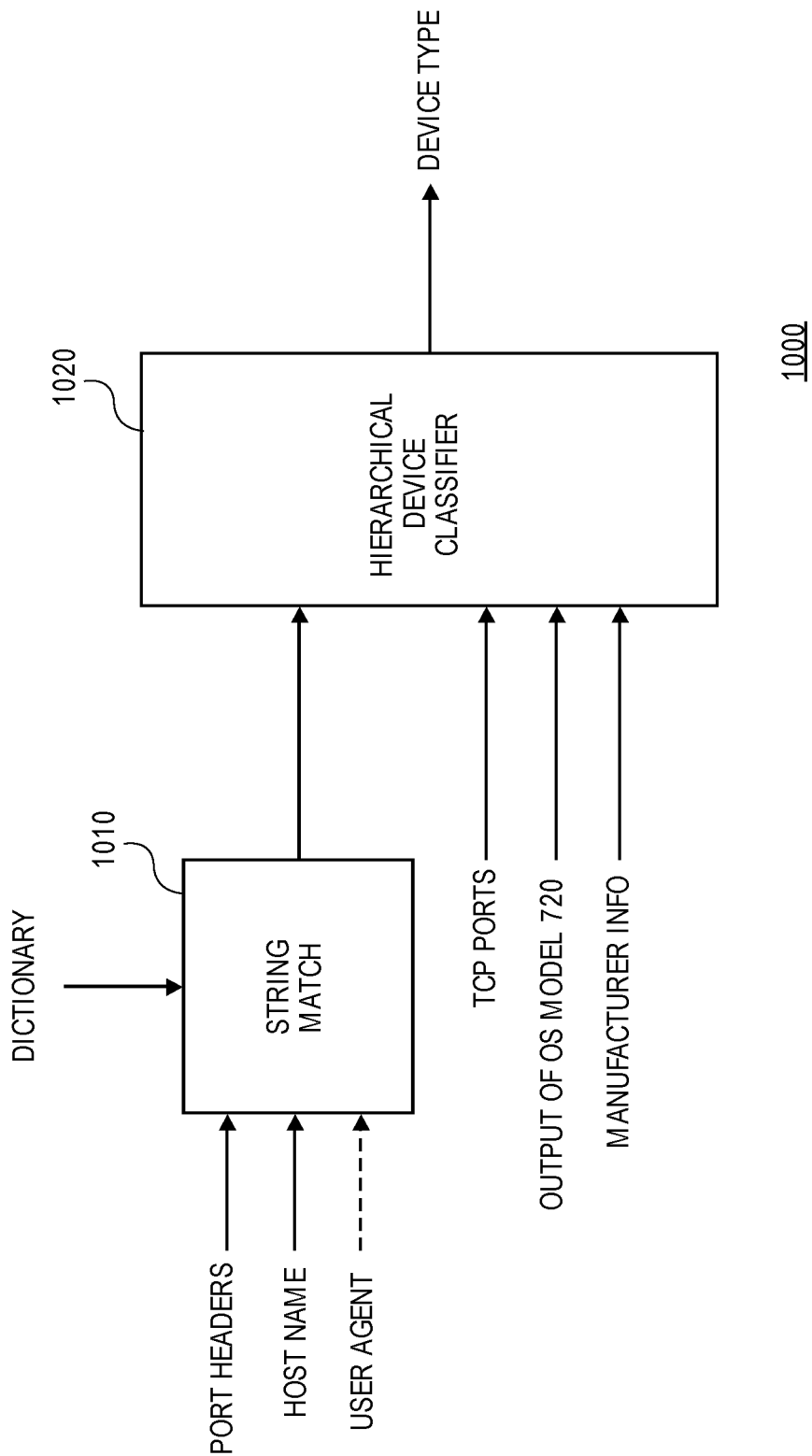
FIG. 10 is a flowchart illustrating the steps performed by the device model according to an embodiment of the invention.

FIG. 10 is a block diagram illustrating the components of device model 730 according to an embodiment of the invention. String matching component 1010 functions similar to that of string matching component 910 discussed above relative to OS model 920. Hierarchical device classifier 1020 considers as input probability information generated by manufacturer model 710, information available about TCP ports of the node, information made available by OS model 720, as well as additional information made available by string matching component 1010.

Hierarchical device classifier 1020 will traverse a hierarchical tree structure where each level of the tree corresponds to a different level of granularity and each node of the tree corresponds to a different category which may be applied to a node. Hierarchical device classifier 1020 traverses this hierarchical tree structure only when a certain confidence level is reached for a certain node of the hierarchical tree structure; hierarchical device classifier 1020 stop traversing the hierarchical tree structure when it lacks confidence to do so.

Figure 11:
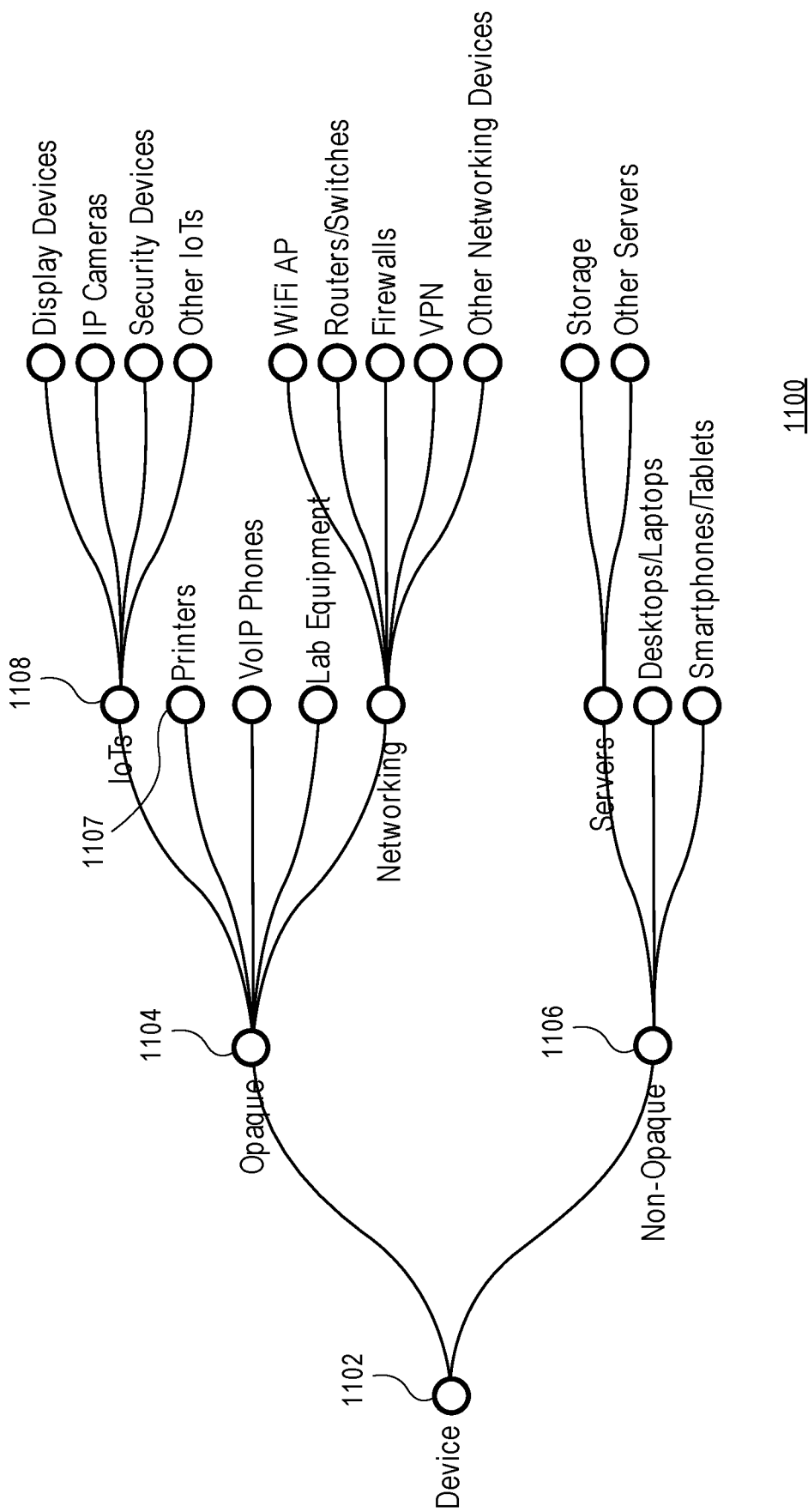
FIG. 11 is an illustration of a hierarchical tree structure 1100 used by models in assigning a category to a network entity.

FIG. 11 is an illustration of a hierarchical tree structure 1100 used by models in assigning a category to a network entity according to embodiments of the invention. Note that hierarchical tree structure 1100 shown in FIG. 11 is but one example, as hierarchical tree structure of an embodiment may be of any size and complexity. The nodes closer to the top of the tree (where node 1102 is the top node) represent the broadest concept, and as you traverse the tree, the concepts represented by the nodes narrow in scope. Each level of hierarchical tree structure 1100 offers incremental differentiation at a conceptual level compared to its neighboring levels in the tree structure. Hierarchical tree structure 1100 may be easily modified to add/remove nodes or otherwise change the hierarchy or structure.

To illustrate an example, consider the case where classification module 194 attempts to categorize node 150 of FIG. 1. Classification module 194, in consultation with probabilistic node model 700 and observation data gathered by one or more agents 102, will attempt to traverse hierarchical tree structure 1100. Initially, this process begins at root node 1102, so that node 150 is associated with the broadest concept, namely that of a device. Any node of enterprise network 110 will be assigned the category of device as any node is a device. Thereafter, an attempt is made by classification module 194, in consultation with probabilistic node model 700 and observation data gathered by one or more agents 102, to determine whether node 150 meets or exceeds the confidence level associated with node 1104 (associated with opaque devices) or node 1106 (associated with non-opaque devices). In this example, assume that the confidence level is met for successful traversal to node 1104, so node 150 will also be assigned the category of an opaque device. Thereafter, the process is repeated for child nodes of node 1104 to see how deep the categorization may be extended.

The dictionaries used by various components of probabilistic node model 700 may be updated over time. For example, if the keyword "virtual machine' is seen quite often, but it is not being matched in the dictionary, then a dialogue box may be displayed to a user to request whether the user wishes to add the word to the dictionary. As another example, certain words in the dictionary might refer to the same concept, such as when an acronym is used in some cases whereas the full name is used in others. As before, a dialogue box may be displayed to a user to request whether the user wishes to combine these words in the dictionary. In this way, human in the loop may assist the refinement of the machine learning processes. Also, a user may be able to provide feedback to probabilistic node model 700 when probabilistic node model 700 is not certain or unable to make an interpretation or prediction based on a set of data. In this way, probabilistic node model 700 may use machine learning techniques to learn from instruction received from a user.

Network Categorization

Prior art techniques for classifying a computer network can be too naïve and trusting for the types of malicious attacks present in current society. To illustrate, certain operating systems may assume that if a network is encountered which has the same name as a previously encountered home network, then that network is deemed to be the home network even if it is, in fact, a different network. As can be appreciated, this misunderstanding can be purposefully exploited by malware.

Certain operations performed by a computer depend upon an accurate assessment of what type of computer network to which the computer is connected. For example, embodiments of the invention may not wish to disperse one or more agents 102 across a network unless the network is an enterprise network and not a public or guest network.

In an embodiment, probabilistic network entity model 196 may include a probabilistic network model. A probabilistic network model of an embodiment functions to render course categorization to fine categorization for a network based on probability and observed evidence in the form of observation data gathered by agents.

FIG. 13 is a chart depicting certain traits associated with various exemplary network categories according to an embodiment of the invention. The example of FIG. 13 depicts four categories which may be used to classify a network, namely a windows enterprise network, a non-windows enterprise network, a home network, and a guest or public network. The four network categories depicted by FIG. 13 show a concrete example, but other embodiments of the invention may employ any number of different network categories.

Each of the four network categories depicted by FIG. 13 are associated with different traits, which are also depicted in FIG. 13. The first two network categories correspond to different types of networks commonly used by companies and other large entities. A windows enterprise network is the most common type of enterprise network, although technical companies might employ a non-windows enterprise network. Both types of networks typically are configured with many subnets. If the Open Shortest Path First (OSPF) or the Routing Information Protocol (RIP) is used on a network, then the network is either a windows enterprise network or a non-windows enterprise network. Similarly, if the Wi-Fi Protected Access 2 protocol (WPA2) is used on a network or if a node is connecting to the network using a virtual private network (VPN) connection, then the network is either an enterprise network or a non-windows business network.

Furthermore, only a windows enterprise network has an Active Directory (AD), which is a directory service that Microsoft developed for Windows domain networks. An Active Directory (AD) is included in most Windows Server operating systems as a set of processes and services. The presence of an AD is the distinguishing feature of a windows enterprise network. A non-windows enterprise network lacks an Active Directory.

A home network typically only has a single subnet. The IEEE 802.1x standard is typically not seen in a home network. Home networks do not employ a captive portal. A home network is uniquely identified using the MAC address and the IP address of the router; in this way, two networks which have the same domain name are distinguishable, since the MAC address and the IP address of the router will be different.

A guest or public network, as with a home network, typically only has a single subnet that lacks the IEEE 802.1x standard. Unlike a home network, a guest or public network very commonly uses a captive portal, which is a web page that the user of a public-access network is obliged to view and interact with before access is granted. Captive portals are typically used by business centers, airports, hotel lobbies, coffee shops, and other venues that offer free Wi-Fi hot spots for Internet users. Guest or public networks are uniquely identified using their domain name and the MAC address of the router.

Figure 12:
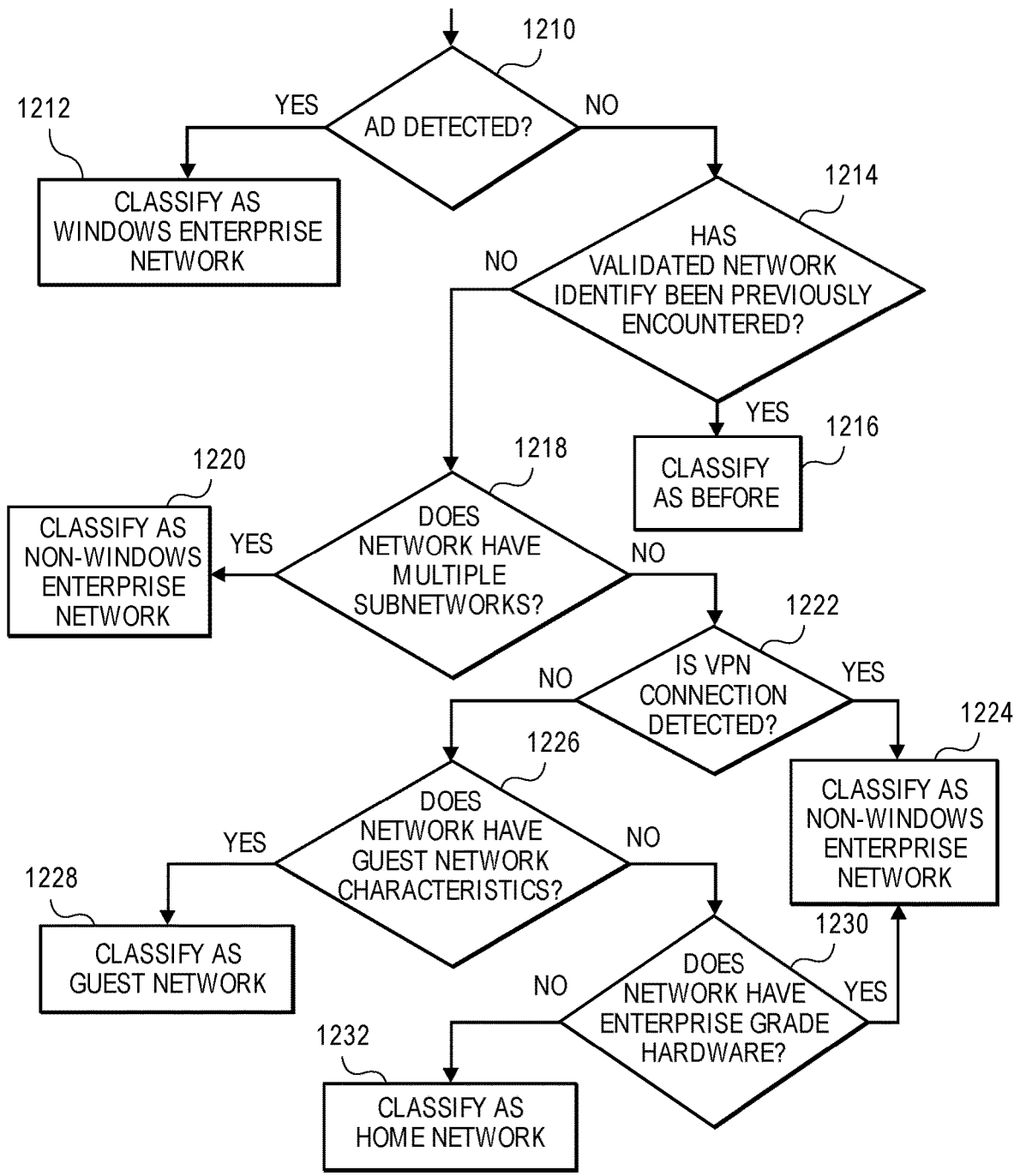
FIG. 12 is a flowchart depicting the steps of classifying a network according to an embodiment of the invention.

An explanation will be presented now as to how the four network categories may be used to categorize a network accessible to a node with reference to FIG. 12, which is a flowchart depicting the steps of classifying a network according to an embodiment of the invention. The steps of FIG. 12 may be performed by software executing on any node of enterprise network 110 upon detecting that a network is accessible to the node.

Initially, in step 1210, a determination is made as to whether an Active Directory (AD) is present on the network to be classified. If the presence of an Active Directory is detected on a network, then in step 1212 the network is classified as a windows enterprise network. It is anticipated that most business networks will be classified as a windows enterprise network. If this particular Active Directory has not been detected before, then classification module 194 stores a record of this Active Directory which describes discovered features and characteristics of the Active Directory and the remainder of the network on which it resides. On the other hand, if this particular Active Directory has been detected before, then classification module 194 updates the record of this Active Directory if necessary to ensure all discovered information about the subnet belonging to this enterprise network is recorded.

If, in performing step 1210, the presence of an Active Directory is not detected on the network, then in step 1214 a determination is made as to whether the domain name of the network is the same as a previously categorized network. This determination may be performed by consulting the records stored by classification module 194. Embodiments do not assume that merely because the domain name of a present network matches the domain name of a previously encountered network that has already been categorized by classification module 194 that the networks are one and the same. Instead, classification module 194 validates the identity of the network using information in its stored records. To validate the identify of a network as being the same network as a previously categorized windows enterprise network or non-windows enterprise network, then both networks must have the same network characteristics. To validate the identify of a network as being the same network as a previously categorized home network, then both networks must have a router with the same MAC address. If, in performing step 1214, validation is performed successfully, then the network is classified using the previously determined classification, e.g., if a network was previously classified as a home network, then the network, after having been validated as a network that has been previously encountered and classified as a home network, will again be classified using the same classification.

If, in performing step 1214, validation cannot be performed successfully on the network, then in step 1218, classification module 194 ascertains where multiple subnets are detected on the network. If multiple subnets are detected in performing step 1218, then in step 1220, the network is classified as a non-windows enterprise network, as a determination was previously made that the network lacked possession of an Active Directory. Classification module 194 then stores a record for this non-windows enterprise network which describes discovered features and characteristics of the non-windows enterprise network.

On the other hand, if multiple subnets are not detected on the network in performing step 1218, then in step 1222 a determination is made as to whether a virtual private network (VPN) connection is detected. If a VPN connection is detected on the network in performing step 1222, then in step 1224 the network is categorized as a non-windows enterprise network. Classification module 194 then stores a record for this non-windows enterprise network which describes discovered features and characteristics of the non-windows enterprise network.

If classification module 194 is unable to categorize the network as a non-windows enterprise network in performing step 1222, then an attempt is made to determine whether the network can be categorized as a guest or public network in step 1226. Classification module 194 categorizes the network as a guest or public network if any of the following conditions are satisfied: (a) the use of a captive portal is detected, (b) the use of the Wired Equivalent Privacy (WEP) security algorithm is detected, (c) the SSID indicates a keyword of 'guest' or 'public,' and (d) the only nodes in the network are a router and the node from which network categorization is performed or from observation data is collected. If in step 1226 classification module 194 is able to categorize the network as a guest or public network, then in step 1228 classification module 194 stores a record for this guest or public network which describes discovered features and characteristics of the guest or public network.

Next, if the network still has yet to be categorized successfully, then in step 1230 classification module 194 ascertains whether the default router of the network is enterprise grade hardware. If the router is enterprise grade hardware and the network lacks a captive portal and possess no indicators that the network is a guest network, then processing proceeds to step 1224 where classification module 194 categorizes the network as a non-windows enterprise network and stores a record for this non-windows enterprise network which describes discovered features and characteristics of the non-windows enterprise network. However, if a determination is made in step 1230 that the network lacks enterprise grade hardware, then in step 1232 classification module 194 categorizes the network as a home network stores a record for this home network which describes discovered features and characteristics of the home network.

In an embodiment, a network may be categorized based on the histogram of the device types that are present in the network. For example, a large number of phones or devices executing an operating system provided by Microsoft Corporation with all ports closed may be categorized as a guest network, while a single network with a large number of NetBIOS responses may be categorized as an enterprise network.

Hardware Mechanisms

Figure 14:
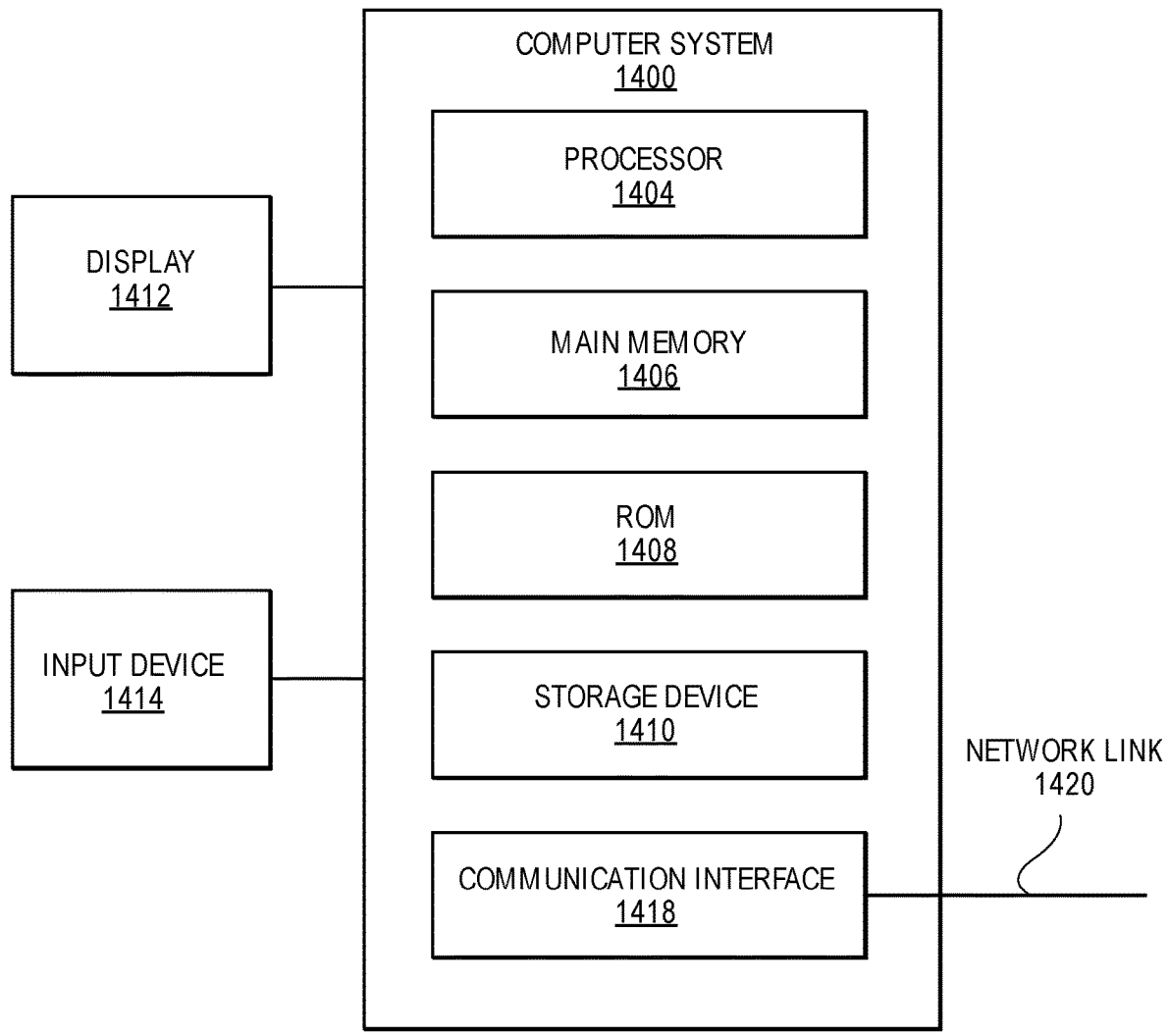
FIG. 14 is a block diagram that illustrates a computer system upon which an embodiment of the invention may be implemented.

In an embodiment, all nodes of enterprise network, local risk modeler server 192, and risk modeler server 190 depicted in FIG. 1 may be implemented by one or more computer systems. FIG. 14 is a block diagram that illustrates a computer system 1400 upon which an embodiment of the invention may be implemented. In an embodiment, computer system 1400 includes processor 1404, main memory 1406, ROM 1408, storage device 1410, and communication interface 1418. Computer system 1400 includes at least one processor 1404 for processing information. Computer system 1400 also includes a main memory 1406, such as a random access memory (RAM) or other dynamic storage device, for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device for storing static information and instructions for processor 1404. A storage device 1410, such as a magnetic disk or optical disk, is provided for storing information and instructions.

Computer system 1400 may be coupled to a display 1412, such as a cathode ray tube (CRT), a LCD monitor, and a television set, for displaying information to a user. An input device 1414, including alphanumeric and other keys, is coupled to computer system 1400 for communicating information and command selections to processor 1404. Other non-limiting, illustrative examples of input device 1414 include a mouse, a trackball, or cursor direction keys for communicating direction information and command selections to processor 1404 and for controlling cursor movement on display 1412. While only one input device 1414 is depicted in FIG. 14, embodiments of the invention may include any number of input devices 1414 coupled to computer system 1400.

Embodiments of the invention are related to the use of computer system 1400 for implementing the techniques described herein. According to one embodiment of the invention, those techniques are performed by computer system 1400 in response to processor 1404 executing one or more sequences of one or more instructions contained in main memory 1406. Such instructions may be read into main memory 1406 from another machine-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 1404 for execution. Such a medium may take many forms, including optical or magnetic disks, such as storage device 1410.

Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a network link 1420 to computer system 1400.

Communication interface 1418 provides a two-way data communication coupling to a network link 1420 that is connected to a local network. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through a local network to a host computer or to data equipment operated by an Internet Service Provider (ISP).

Computer system 1400 can send messages and receive data, including program code, through the network(s), network link 1420 and communication interface 1418. For example, a server might transmit a requested code for an application program through the Internet, a local ISP, a local network, subsequently to communication interface 1418. The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for automatic assignment of categories to network entities based on observed evidence, which when executed by one or more processors, cause:

two or more agents gathering, from multiple sources across the network, observation data that identifies or informs observations made by the two or more agents about the network and a plurality of nodes of the network, wherein the observation data includes, for each of the plurality of nodes, traffic information, application-level information, and configuration information, wherein at least one source from which the two or more agents gather said observation data includes a catalog dataset comprising product information for at least one hardware manufacturer;

the two or more agents, executing across the network, providing the observation data to a classification module; and the classification module assigning a particular device category to each of the plurality of nodes based on the observation data and a probabilistic node model, wherein the probabilistic node model considers two or more of a set of probabilities to ascertain a recommended device category for a particular node, wherein the set of probabilities include: a first probability based on a manufacturer associated with the particular node, a second probability based on operating system associated with the particular node, a third probability based on other nodes in a local vicinity of the particular node on the network, and a fourth probability based on an administrator web page associated with the particular node.

2. The non-transitory computer-readable storage medium of claim 1, wherein the observation data identifies observations made about one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents.

3. The non-transitory computer-readable storage medium of claim 1, wherein the probabilistic node model considers an Organization Unique Identifier (OUI) for the particular node and uses observed evidence to ascertain whether the OUI identifies the original equipment manufacturer (OEM) or the original design manufacturer (ODM).

4. The non-transitory computer-readable storage medium of claim 1, wherein execution of the one or more sequences of instructions further cause:

analyzing data associated with a manufacturer to generate a set of probabilities that each indicate a likelihood that the particular device is a particular type of device.

5. The non-transitory computer-readable storage medium of claim 1, wherein execution of the one or more sequences of instructions further cause:

analyzing (a) a first set of probabilities that each indicate a likelihood that the particular node is a particular type of device and (b) observations gathered by the one or more agents about the particular node to generate a second set of probabilities that each indicate a likelihood that the particular node is executing a particular type of operating system.

6. The non-transitory computer-readable storage medium of claim 1, wherein execution of the one or more sequences of instructions further cause:

analyzing (a) a first set of probabilities that each indicate a likelihood that the particular node is executing a particular type of operating system and (b) observations gathered by the one or more agents about the particular node to traverse a hierarchical tree structure until a confidence threshold is not met, wherein each node of the hierarchical tree structure is associated with a different category which can be assigned to the particular node.

7. The non-transitory computer-readable storage medium of claim 6, wherein execution of the one or more sequences of instructions further cause:

accessing an open administrator port on the particular node to obtain one or more web pages;

extracting, from the one or more web pages, key words that are pertinent to identifies characteristics of the particular node; and using said identified characteristics, obtained from the one or more web pages, in traversing said hierarchical tree structure.

8. The non-transitory computer-readable storage medium of claim 6, wherein execution of the one or more sequences of instructions further cause:

obtaining, from the two or more agents, network neighbor information that describes features of nodes on the network in a vicinity of the particular node; and using said network neighbor information in traversing said hierarchical tree structure.

9. A system for automatic assignment of categories to network entities based on observed evidence, comprising:

one or more processors; and one or more non-transitory computer-readable storage mediums storing one or more sequences of instructions, which when executed, cause:

two or more agents gathering, from multiple sources across the network, observation data that identifies or informs observations made by the two or more agents about the network and a plurality of nodes of the network, wherein the observation data includes, for each of the plurality of nodes, traffic information, application-level information, and configuration information, wherein at least one source from which the two or more agents gather said observation data includes a catalog dataset comprising product information for at least one hardware manufacturer;

the two or more agents, executing upon one or more computer systems across the network, providing the observation data to a classification module; and the classification module assigning a particular device category to each of the plurality of nodes based on the observation data and a probabilistic node model, wherein the probabilistic node model considers two or more of a set of probabilities to ascertain a recommended device category for a particular node, wherein the set of probabilities include: a first probability based on a manufacturer associated with the particular node, a second probability based on operating system associated with the particular node, a third probability based on other nodes in a local vicinity of the particular node on the network, and a fourth probability based on an administrator web page associated with the particular node.

10. The system of claim 9, wherein the observation data identifies observations made about one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents.

11. The system of claim 9, wherein the probabilistic node model considers an Organization Unique Identifier (OUI) for the particular node and uses observed evidence to ascertain whether the OUI identifies the original equipment manufacturer (OEM) or the original design manufacturer (ODM).

12. The system of claim 9, further comprising:

the classification module analyzing data associated with a manufacturer to generate a set of probabilities that each indicate a likelihood that the particular device is a particular type of device.

13. The system of claim 9, further comprising:
the classification module analyzing (a) a first set of probabilities that each indicate a likelihood that the particular node is executing a particular type of operating system and (b) observations gathered by the one or more agents about the particular node to traverse a hierarchical tree structure until a confidence threshold is not met,
wherein each node of the hierarchical tree structure is associated with a different category which can be assigned to the particular node.

14. The system of claim 13, wherein the classification module further performs:
accessing an open administrator port on the particular node to obtain one or more web pages;
extracting, from the one or more web pages, key words that are pertinent to identifies characteristics of the particular node; and
using said identified characteristics, obtained from the one or more web pages, in traversing said hierarchical tree structure.

15. The system of claim 13, wherein the classification module further performs:
obtaining, from the two or more agents, network neighbor information that describes features of nodes on the network in a vicinity of the particular node; and
using said network neighbor information in traversing said hierarchical tree structure.

16. A method for automatic assignment of categories to network entities based on observed evidence, comprising:
two or more agents gathering, from multiple sources across the network, observation data that identifies or informs observations made by the two or more agents about the network and a plurality of nodes of the network, wherein the observation data includes, for each of the plurality of nodes, traffic information, application-level information, and configuration information,
wherein at least one source from which the two or more agents gather said observation data includes a catalog dataset comprising product information for at least one hardware manufacturer;
the two or more agents, executing across the network, providing the observation data to a classification module; and
the classification module assigning a particular device category to each of the plurality of nodes based on the observation data and a probabilistic node model,
wherein the probabilistic node model considers two or more of a set of probabilities to ascertain a recommended device category for a particular node, wherein the set of probabilities include: a first probability based on a manufacturer associated with the particular node, a second probability based on operating system associated with the particular node, a third probability based on other nodes in a local vicinity of the particular node on the network, and a fourth probability based on an administrator web page associated with the particular node.

17. The method of claim 16, wherein the observation data identifies observations made about one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents.

18. The method of claim 16, wherein the probabilistic node model considers an Organization Unique Identifier (OUI) for the particular node and uses observed evidence to ascertain whether the OUI identifies the original equipment manufacturer (OEM) or the original design manufacturer (ODM).

19. The method of claim 16, further comprising:
the classification module analyzing data associated with a manufacturer to generate a set of probabilities that each indicate a likelihood that the particular device is a particular type of device.

20. The method of claim 16, further comprising:
analyzing (a) a first set of probabilities that each indicate a likelihood that the particular node is a particular type of device and (b) observations gathered by the one or more agents about the particular node to generate a second set of probabilities that each indicate a likelihood that the particular node is executing a particular type of operating system.

21. The method of claim 16, further comprising:
analyzing (a) a first set of probabilities that each indicate a likelihood that the particular node is executing a particular type of operating system and (b) observations gathered by the one or more agents about the particular node to traverse a hierarchical tree structure until a confidence threshold is not met,
wherein each node of the hierarchical tree structure is associated with a different category which can be assigned to the particular node.

22. The method of claim 21, further comprising:
accessing an open administrator port on the particular node to obtain one or more web pages;
extracting, from the one or more web pages, key words that are pertinent to identifies characteristics of the particular node; and
using said identified characteristics, obtained from the one or more web pages, in traversing said hierarchical tree structure.

23. The method of claim 21, further comprising:
obtaining, from the two or more agents, network neighbor information that describes features of nodes on the network in a vicinity of the particular node; and
using said network neighbor information in traversing said hierarchical tree structure.

* * * * *